United States Patent
Wang et al.

(10) Patent No.: US 12,328,506 B2
(45) Date of Patent: Jun. 10, 2025

(54) PHOTOGRAPHING CONTROL METHOD AND APPARATUS, COMPUTER DEVICE AND STORAGE MEDIUM

(71) Applicant: ZHEJIANG HUACHUANG VISION TECHNOLOGY CO., LTD., Hangzhou (CN)

(72) Inventors: Wenlong Wang, Hangzhou (CN); Xuhong Hua, Hangzhou (CN); Guoquan Yang, Hangzhou (CN); Yaxi Cao, Hangzhou (CN); Keyan Wang, Hangzhou (CN)

(73) Assignee: ZHEJIANG HUACHUANG VISION TECHNOLOGY CO., LTD., Hangzhou (CN)

( * ) Notice: Subject to any disclaimer, the term of this patent is extended or adjusted under 35 U.S.C. 154(b) by 177 days.

(21) Appl. No.: 18/274,742

(22) PCT Filed: Jan. 20, 2022

(86) PCT No.: PCT/CN2022/073007
§ 371 (c)(1),
(2) Date: Jul. 28, 2023

(87) PCT Pub. No.: WO2022/161250
PCT Pub. Date: Aug. 4, 2022

(65) Prior Publication Data
US 2024/0114246 A1   Apr. 4, 2024

(30) Foreign Application Priority Data

Jan. 28, 2021  (CN) .......................... 202110114788.9
Mar. 2, 2021   (CN) .......................... 202110230319.3

(51) Int. Cl.
*H04N 23/69*   (2023.01)
*G06T 3/40*    (2024.01)
(Continued)

(52) U.S. Cl.
CPC ............... *H04N 23/69* (2023.01); *G06T 3/40* (2013.01); *G06T 7/13* (2017.01); *G06T 7/62* (2017.01);
(Continued)

(58) Field of Classification Search
CPC .... H04N 23/611; H04N 23/60; H04N 23/695; H04N 23/69; G06V 40/161; G06T 7/62; G06T 7/13; G06T 3/40; G06T 2207/30201
(Continued)

(56) References Cited

U.S. PATENT DOCUMENTS 7,417,673 B2 *  8/2008  Wright ................... H04N 23/69
                                                    348/240.99
9,204,053 B2 * 12/2015  Matsuzawa ............ H04N 23/61
(Continued)

FOREIGN PATENT DOCUMENTS

CN    101185322 A    5/2008
CN    106341596 A    1/2017
(Continued)

OTHER PUBLICATIONS

First notice of examination opinions of 202110114788.9.
International Search Report of PCT/CN2022/073007.

*Primary Examiner* — Pritham D Prabhakher

(57) ABSTRACT

A photographing control method and apparatus, a computer device and a storage medium are provided. The method includes determining a first ratio, wherein the first ratio is a ratio of the current optical zoom ratio of a target photographic device to a maximum optical zoom ratio of the target photographic device; determining a second ratio, wherein the second ratio is a proportion of the area of a person face region currently captured by the target photographic device in a whole captured picture; determining whether the first ratio is less than or equal to a first ratio threshold and the
(Continued)

second ratio is less than or equal to a second ratio threshold; and if yes, controlling the target photographic device to perform optical zoom, and if no, controlling the target photographic device to perform digital zoom.

20 Claims, 8 Drawing Sheets

(51) Int. Cl.
  *G06T 7/13*   (2017.01)
  *G06T 7/62*   (2017.01)
  *G06V 40/16*  (2022.01)
  *H04N 23/695*  (2023.01)

(52) U.S. Cl.
  CPC ......... *G06V 40/161* (2022.01); *H04N 23/695* (2023.01); *G06T 2207/30201* (2013.01)

(58) Field of Classification Search
  USPC ...................................................... 348/240.1
  See application file for complete search history.

(56) References Cited

U.S. PATENT DOCUMENTS

| | | | | |
|---|---|---|---|---|
| 10,419,683 B2* | 9/2019 | Ogawa | ................. | H04N 23/631 |
| 10,469,759 B2* | 11/2019 | Ardo | ...................... | H04N 23/75 |
| 2006/0269265 A1* | 11/2006 | Wright | ................... | H04N 23/69 |
| | | | | 348/E5.055 |
| 2007/0115138 A1* | 5/2007 | Arakawa | ............. | B60R 11/0235 |
| | | | | 348/148 |
| 2009/0268060 A1* | 10/2009 | Georgis | ................. | H04N 23/69 |
| | | | | 348/240.1 |
| 2010/0079623 A1* | 4/2010 | Tomita | ................. | H04N 23/611 |
| | | | | 348/240.99 |
| 2012/0062692 A1* | 3/2012 | Tsubusaki | ............ | H04N 23/635 |
| | | | | 348/36 |
| 2013/0076945 A1* | 3/2013 | Nagata | ................... | H04N 23/69 |
| | | | | 348/240.2 |
| 2013/0265467 A1* | 10/2013 | Matsuzawa | ........... | H04N 23/69 |
| | | | | 348/240.1 |
| 2016/0191811 A1* | 6/2016 | Tsubusaki | .............. | G06V 10/25 |
| | | | | 348/240.1 |
| 2018/0270426 A1* | 9/2018 | Ogawa | ................. | G06V 40/161 |
| 2019/0141251 A1* | 5/2019 | Ardo | ...................... | H04N 23/62 |
| 2021/0120171 A1* | 4/2021 | Yasuda | .................. | H04N 23/54 |
| 2021/0306555 A1* | 9/2021 | Ostap | ..................... | H04N 23/69 |

FOREIGN PATENT DOCUMENTS

| | | |
|---|---|---|
| CN | 109495681 A | 3/2019 |
| CN | 111405185 A | 7/2020 |
| CN | 112449117 A | 3/2021 |
| CN | 112601028 A | 4/2021 |
| JP | 2018106034 A | 7/2018 |

* cited by examiner

PHOTOGRAPHING CONTROL METHOD AND APPARATUS, COMPUTER DEVICE AND STORAGE MEDIUM

CROSS-REFERENCE TO RELATED APPLICATIONS

This application is an U.S. national phase application under 35 U.S.C. § 371 based upon international patent application No. PCT/CN2022/073007, filed on Jan. 20, 2022, which itself claims priority to Chinese patent applications No. 202110114788.9, filed on Jan. 28, 2021, titled "METHOD OF DETERMINING FOCUS STEP LENGTH AND APPARATUS, STORAGE MEDIUM AND ELECTRICAL DEVICE", and No. 202110230319.3, filed on Mar. 2, 2021, titled "PHOTOGRAPHING CONTROL METHOD AND APPARATUS, COMPUTER DEVICE AND STORAGE MEDIUM". The contents of the above applications are hereby incorporated by reference.

TECHNICAL FIELD

The present disclosure generally relates to a field of image communication technology, and in particular, to a photographing control method and an apparatus, a computer device, and a storage medium.

BACKGROUND

With development of image communication technology, a videoconferencing system has become more and more popular, realizing remote real-time transmission of voice, image, data and other related technologies by network convergence technology and codec technology. In the current videoconferencing system, high picture quality and sound quality are pursued. For picture quality, more emphasis is placed on good face capture effect, i.e., more focus on focus of a face area. It becomes more and more important that focus on the face area, moving the face area to a screen center, capturing right image for display, especially adjusting to a right magnification for close-ups by zoom technology. When only a single person exists in the currently captured image, a close-up of a face of the single person can be performed, and when multiple faces are captured, a panoramic close-up can be performed.

At present, most photographic devices in a video conferencing system have a zoom function, which can be scaled by digital zoom and optical zoom to achieve a picture output with a suitable quality. However, some complexities may exist in the picture of a real scene, such as multiple depths of field, multiple faces, etc., which are more difficult to debug when manual debugging is used. Moreover, it is not possible to utilize a zoom mode accurately and quickly, resulting in an inability to take both image clarity and face capture into account, and the difficulty of quickly backing up after a face is disappeared is also particularly prominent.

SUMMARY

The present disclosure provides a photographing control method and an apparatus, a computer device, and a storage medium to solve at least one problem in the background.

In a first aspect, the present disclosure provides a photographing control method. The method includes: determining a first ratio; determining a second ratio; determining whether the first ratio is less than or equal to a first ratio threshold and the second ratio is less than or equal to a second ratio threshold; if yes, controlling the target photographic device to perform optical zoom; and if no, controlling the target photographic device to perform digital zoom. The first ratio is a ratio of the current optical zoom ratio of a target photographic device to a maximum optical zoom ratio of the target photographic device, and the second ratio is a proportion of an area of a person face region currently captured by the target photographic device in a whole captured picture.

In an alternative embodiment, for a single person face currently captured by the target photographic device, the second ratio is a proportion of an area of the single person face in the whole captured picture. For a plurality of person faces currently captured by the target photographic device, the second ratio is a proportion of an area of a combined face region in the whole captured picture. The area of the combined face region is a sum of areas of the plurality of person faces.

In an alternative embodiment, the first ratio threshold is in a range from 0.45 to 0.55.

In an alternative embodiment, the second ratio threshold is in a range from 0.15 to 0.25.

In an alternative embodiment, the method further includes: determining a center position of a person region based on information of the whole captured picture currently captured by the target photographic device; and either or both of controlling the target photographic device to move and controlling the target photographic device to rotate, according to the center position of the person region and a center position of the whole captured picture, so that the center position of the person region coincides with the center position of the whole captured picture.

In an alternative embodiment, the either or both of controlling the target photographic device to move and controlling the target photographic device to rotate is performed before the determining the first ratio.

In an alternative embodiment, the determining the center position of the person region based on information of the whole captured picture currently captured by the target photographic device includes: for a single person face currently captured by the target photographic device, determining a center position of the single person face as the center position of the person region; and for a plurality of person faces currently captured by the target photographic device, determining a center position of a combined person body region as the center position of the person region. The combined person body region is a closed region determined based on image boundaries of person bodies corresponding to the plurality of person faces, and the closed region covers images of person bodies.

In an alternative embodiment, the either or both of controlling the target photographic device to move and controlling the target photographic device to rotate, according to the center position of the person region and the center position of the whole captured picture includes: determining a horizontal position offset angle based on an object distance and a horizontal offset between the center position of the person region and the center position of the whole captured picture; determining a vertical position offset angle based on the object distance and a vertical offset between the center position of the person region and the center position of the whole captured picture; and controlling the target photographic device to rotate based on the horizontal position offset angle and the vertical position offset angle. The object distance is a distance between an actual position of a currently captured face and an actual position of the target photographic device.

In an alternative embodiment, the object distance is determined based on the current optical zoom ratio of the target photographic device and the second ratio.

In an alternative embodiment, after the controlling the target photographic device to perform optical zoom or controlling the target photographic device to perform digital zoom, a ratio of an area of a person region in a display screen of the target photographic device to a total area of the display screen is in a range from 0.7 to 0.8. For a single person face currently captured by the target photographic device, the area of the person region is an area of image region of a person body corresponding to the single person face. For a plurality of person faces currently captured by the target photographic device, the area of the person region is an area of a combined person body region, the combined person body region is a closed region determined based on image boundaries of person bodies corresponding to the plurality of person faces, and the closed region covers images of person bodies.

In an alternative embodiment, the area of image region of the person body is determined based on an area of a corresponding region of the single person face and a preset multiplier, and the preset multiplier is a preset ratio of the area of image region of the person body to the area of the person face region.

In an alternative embodiment, after the controlling the target photographic device to perform optical zoom, the method further includes: performing face region detection on a display screen of the target photographic device; when no face region is detected in the display screen, controlling the target photographic device to perform an optical zoom backoff and back to half the current optical zoom ratio of the target photographic device; performing face region detection on the display screen of the target camera device after the optical zoom backoff is performed; and when no face region is detected in the display screen of the target photographic device after the optical zoom backoff is performed, controlling the target photographic device to perform another optical zoom backoff and back to a wide-angle end.

In an alternative embodiment, after the controlling the target photographic device to perform digital zoom, the method further includes: performing face region detection on a display screen of the target photographic device; and when no face region is detected in the display screen, determining whether the person face region is in the whole captured picture; if yes, adjusting the display screen to display the person face region; and if no, controlling the target photographic device to perform digital zoom backoff and optical zoom backoff.

In an alternative embodiment, the controlling the target photographic device to perform optical zoom further includes: obtaining point positions of a focus motor of the target photographic device at the time of acquiring a preset number of successive frame images, respectively, and obtaining definitions of the frame images; determining a coordinate point corresponding to each of the frame images based on a plurality of the point positions of the focus motor and a plurality of definitions obtained, respectively, and a coordinate value of the coordinate point corresponding to each of the frame images including the point position of the focus motor at the time of acquiring a corresponding frame image and the definition of the corresponding frame image; and determining a target adjustment step length of the focus motor of the target photographic device based on coordinate values of coordinate points corresponding to a first target frame image, a second target frame image, a third target frame image, and a fourth target frame image of the successive frame images. The fourth target frame image is a frame image before the third target frame image, the third target frame image, the second target frame image, and the first target frame image are sequentially adjacent frame images, and the first target frame image is the last frame image of the successive frame images.

In an alternative embodiment, the determining the target adjustment step length of the focus motor of the target photographic device based on coordinate values of coordinate points corresponding to the first target frame image, the second target frame image, the third target frame image, and the fourth target frame image of the successive frame images further includes: determining a first angle change value and a first residual change rate of a first coordinate point based on a first coordinate value, a second coordinate value, and a fourth coordinate value; determining a second angle change value and a second residual change rate of a second coordinate point based on the second coordinate value, a third coordinate value, and the fourth coordinate value; and determining the target adjustment step length of the focus motor of the target photographic device based on the first angle change value, the first residual change rate, the second angle change value, and the second residual change rate. The first coordinate value is a coordinate value of the first coordinate point corresponding to the first target frame image, the second coordinate value is a coordinate value of a second coordinate point corresponding to the second target frame image, and the fourth coordinate value is a coordinate value of a fourth coordinate point corresponding to the fourth target frame image. The first angle change value is an amount of change between a first average definition value per step and a second average definition value per step, the first average definition value per step is an average definition value per step between the first target frame image and the fourth target frame image, the second average definition value per step is an average definition value per step between the first target frame image and the second target frame image, and the first residual change rate is configured to indicate a change rate of definition per step between the first target frame image and the second target frame image. The third coordinate value is a coordinate value of a third coordinate point corresponding to the third target frame image, the second angle change value is an amount of change between a third average definition value per step and a fourth average definition value per step, the third average definition value per step is an average definition value per step between the second target frame image and the fourth target frame image, the fourth average definition value per step is an average definition value per step between the second target frame image and the third target frame image, and the second residual change rate is configured to indicate a change rate of definition per step between the second target frame image and the third target frame image.

In an alternative embodiment, the determining the target adjustment step length of the focus motor of the target photographic device based on the first angle change value, the first residual change rate, the second angle change value, and the second residual change rate further includes: determining a first difference value between the first angle change value and the second angle change value; determining a second difference value between the first residual change rate and the second residual change rate; and determining the target adjustment step length of the focus motor of the target photographic device based on the first difference value and the second difference value.

In an alternative embodiment, the determining the target adjustment step length of the focus motor of the target photographic device based on the first difference value and the second difference value further includes: determining a target convergence value based on the first difference value and the second difference value; and determining the target adjustment step length based on the target convergence value.

In an alternative embodiment, the determining the target adjustment step length based on the target convergence value further includes: when the target convergence value satisfies a first condition, determining the target adjustment step length to be a preset step value; and when the target convergence value does not satisfy the first condition, determining the target adjustment step length to be an initial step. The initial step is a step used by the target photographic device in acquiring the preset number of the successive frame images.

In an alternative embodiment, after the determining the target adjustment step length of the focus motor of the target photographic device, the method further includes: performing focus to the target photographic device based on the target adjustment step length.

In a second aspect, the present disclosure further provides a photographing control apparatus. The apparatus includes a first determining module, a second determining module, a judgement module, and a control module. The first determining module is configured for determining a first ratio, and the first ratio is a ratio of the current optical zoom ratio of a target photographic device to a maximum optical zoom ratio of the target photographic device. The second determining module is configured for determining a second ratio, the second ratio is a proportion of an area of a person face region currently captured by the target photographic device in a whole captured picture. The judgement module is configured for determining whether the first ratio is less than or equal to a first ratio threshold and the second ratio is less than or equal to a second ratio threshold. The control module is configured for controlling the target photographic device to perform optical zoom when a judgement result is yes and controlling the target photographic device to perform digital zoom when the judgement result is no.

In a third aspect, the present disclosure further provides a computer device, including a processor and a memory that stores a computer program running on the processor. The computer program is executed by the processor to implement the steps of the photographing control method in any one of the above embodiments.

In a fourth aspect, the present disclosure further provides a storage medium having stored a computer program. The computer program is executed by a processor to implement the steps of the photographing control method in any one of the above embodiments.

In the above photographing control method and the apparatus, the computer device, and the storage medium, the first ratio is determined, and the first ratio is a ratio of the current optical zoom ratio of a target photographic device to a maximum optical zoom ratio of the target photographic device. A second ratio is determined, and the second ratio is a proportion of an area of a person face region currently captured by the target photographic device in a whole captured picture. It is determined that whether the first ratio is less than or equal to a first ratio threshold and the second ratio is less than or equal to a second ratio threshold; if yes, the target photographic device is controlled to perform optical zoom; and if no, the target photographic device is controlled to perform digital zoom. In this way, an adaptive selection of optical zoom and digital zoom can be realized according to the current optical zoom ratio and the proportion of the area of the person face region, which not only meets a need of a close-up by using the zoom technology accurately and rapidly, but also obtains better image quality, thereby facilitating the close-up and capture of the person face region.

Furthermore, the focus step length can be adjusted according to the coordinate values of coordinate points of the successive frame images, so that the target photographic device can focus quickly, thereby reducing the time spent in the focus process, and improving the focus efficiency.

The details of one or more embodiments of the present disclosure are set forth in the accompanying drawings and the description below. Other features, objects and advantages of the present disclosure will become apparent from the description, drawings, and claims.

BRIEF DESCRIPTION OF THE DRAWINGS

The accompanying drawings illustrated herein are used to provide a further understanding of the present disclosure and form a part of the present disclosure, and the schematic embodiments of the present disclosure and illustrations thereof are used to explain the present disclosure and do not constitute an undue limitation of the present disclosure.

DETAILED DESCRIPTION OF THE EMBODIMENT

Figure 1:
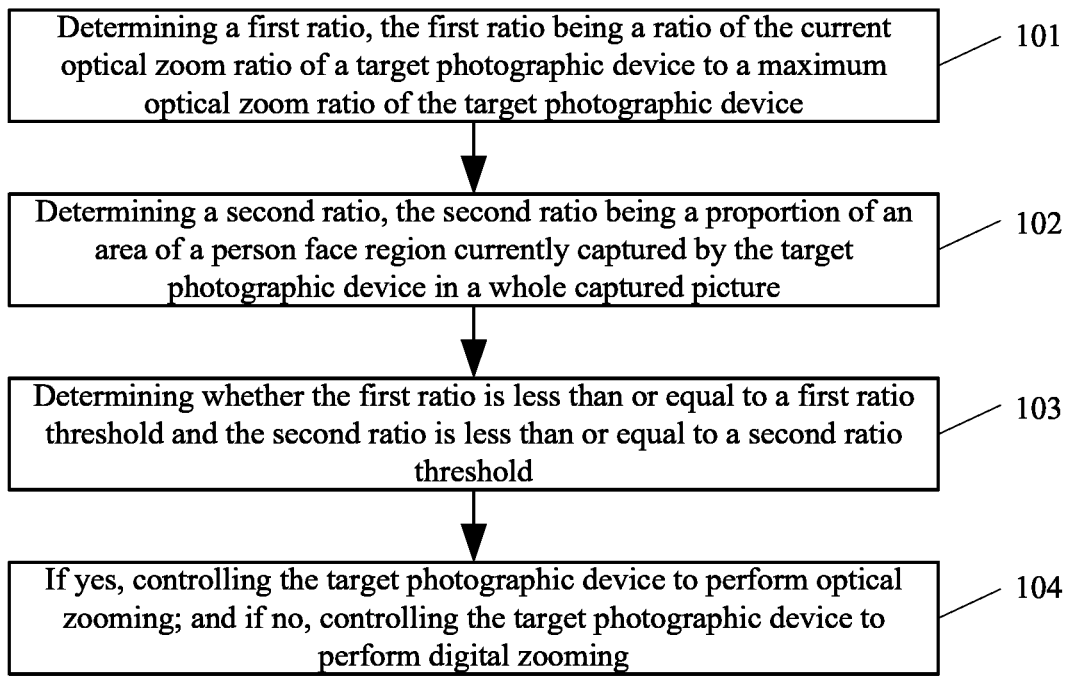
FIG. 1 is a flowchart of a photographing control method in an embodiment.

In order to make objects, technical solutions and advantages of the present disclosure more clearly understood, the present disclosure is described and illustrated in the following with reference to the accompanying drawings and embodiments. It should be understood that specific embodiments described herein are only used to explain the present disclosure and not intended to limit the present disclosure. All other embodiments obtained by those skilled in the art based on the embodiments of the present disclosure without making creative labor are within the scope of the present disclosure. It is also understood that although the efforts made in such development process may be complex and lengthy, some changes in design, manufacture or production based on the technical content disclosed in the present disclosure are only conventional technical means to those skilled in the art related to the content disclosed in the present disclosure and should not be construed as inadequate for the content disclosed in the present disclosure.

The reference to "embodiment" in the present disclosure means that with reference to the particular features, structures or characteristics described in the embodiments may be included in at least one embodiment of the present disclosure. The phrase "embodiment" appears in various positions in the description does not necessarily refer to the same embodiment, nor is it a separate or embodiment that is mutually exclusive with other embodiments. It can be expressly and implicitly understood by those skilled in the art that the embodiments described in the present disclosure may be combined with other embodiments in the absence of conflict.

Unless otherwise defined, all technical and scientific terms used herein have the same meaning as a skilled person in the art would understand. The term "one", "a", "an", "the" and other similar words as used in the present invention do not indicate quantitative limitations, and they can be singular or plural. The terms "include", "comprise", "have", and any variation thereof, as used in the present invention, are intended to cover a non-exclusive inclusion. For example, processes, methods and systems, and products or devices including a series of steps or modules (units) are not limited to listed steps or units, but may include steps or units not listed, or may include other steps or units inherent in those processes, methods, products or devices. The terms "connection", "connected", "coupling", and other similar words as used in the present invention are not limited to physical or mechanical connections, but may include electrical connections, which can be direct connections or indirect connections. The term "plurality" in the present invention refers to two or more. "And/or" describes an association relationship between associated objects, indicating that there can be three kinds of relationships. For example, "A and/or B" can mean that A exists alone, A and B exist at the same time, and B exists alone. The terms "first", "second", "third", etc. involved in the present invention are only configured for distinguishing similar objects, and do not represent a specific order of the objects.

Currently, optical zoom and digital zoom are main scaling technologies applied in a photographic device. The optical zoom can realize image scaling by movement of a focus lens group, and image quality would not be lost. The digital zoom can enlarge an image by cropping the image, and the greater a magnification, the more loss of the image quality caused by interpolation of the image. Moreover, after realizing image enlargement of a captured face region via the digital zoom, since a panoramic image in the digital zoom can be obtained in real time, when the face suddenly disappears, a panoramic picture obtained by lens in the photographic device can be wider, and a switch from a scene to a next scene can be faster. Therefore, detection of two pictures with a single photographic device can be realized. However, when the image enlargement is realized via the optical zoom, when the face suddenly disappears, an area detected in an image will be greatly decreased and a switching speed for the next scene will be affected. Therefore, optical zoom and digital zoom both have advantages and disadvantages, and need to be selected reasonably according to actual situations and needs.

The present disclosure provides a photographing control method, and FIG. 1 is a flowchart of the photographing control method. Referring to FIG. 1, the method includes the following step 101 to step 103:

at step 101, determining a first ratio, the first ratio being a ratio of the current optical zoom ratio of a target photographic device to a maximum optical zoom ratio of the target photographic device;

at step 102, determining a second ratio, the second ratio being a proportion of an area of a person face region currently captured by the target photographic device in a whole captured picture;

at step 103, determining whether the first ratio is less than or equal to a first ratio threshold and the second ratio is less than or equal to a second ratio threshold; and at step 104, if a determination result at step 103 is yes, controlling the target photographic device to perform optical zoom; and if the determination result at step 103 is no, controlling the target photographic device to perform digital zoom.

It is understood that in the present embodiment, an adaptive selection of optical zoom and digital zoom can be realized according to the current optical zoom ratio and the proportion of the area of the person face region, which not only meets a need of a close-up by using the zoom technology accurately and rapidly, but also obtains better image quality, thereby facilitating the close-up and capture of the person face region.

Figure 2:
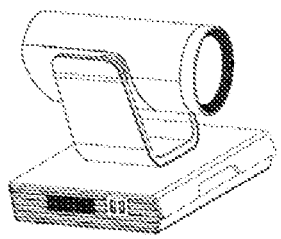
FIG. 2 is a schematic diagram of a pan tilt zoom (PTZ) camera in an embodiment.

The photographing control method provided in the present embodiment can be applied to an application environment as shown in FIG. 2. The target photographic device in FIG. 2 can be a pan tilt zoom (PTZ) camera, and the PTZ camera can include a rotatable pan-tilt and a camera mounted on the pan-tilt. When the camera tracks and captures the face, the pan-tilt can be driven to move to an appropriate center position by analyzing and calculating the face region and a center position of the camera. Moreover, an appropriate zoom ratio of the camera can be obtained by analyzing a size of the area of the person face region and a size of the whole captured picture. A problem of focus on the face region with a single PTZ camera can be well solved by the method provided in the present embodiment, thus realizing a rapid frame selection and focus of the face region. The camera can be but not limited to a gun-shaped camera, a spherical camera, or a dome camera. The camera can be located above or below the pan-tilt, and a relative orientation of the camera and the pan-tilt is not limited. It is understood that although the camera can be driven by a rotation of the pan-tilt is illustrated in the above embodiment, the application environment of the present embodiment is not limited herein. Specifically, in some other embodiments, the target photographic device may be controlled to move and/or rotate.

Furthermore, the photographing control method provided in the present embodiment may be applied to a single camera, that is, a photographing control device may perform the steps in the above photographing control method by controlling a camera.

At the step 101, determining the first ratio can include: determining the current optical zoom ratio denoted as $X_{oz}$ of the camera, and calculating a ratio of the $X_{oz}$ to the maximum optical zoom ratio denoted as $X_z$ of the camera. The ratio can be determined as the first ratio, which can be denoted as $X_{oz}/X_z$.

In the present embodiment, the current optical zoom ratio of the camera can specifically refer to the current optical zoom ratio of lens of the camera. Similarly, the maximum optical zoom ratio of the camera can specifically refer to the maximum optical zoom ratio of the lens of the camera.

The maximum optical zoom ratio of the camera can be determined based on functions of the camera and usually fixed.

At the step 102, determining the second ratio can include: determining the area of the person face region currently captured by the camera and denoted as $S_{face}$, and calculating the proportion of $S_{face}$ in an area of the whole captured picture denoted as $S_w$. The proportion can be determined as the second ratio, which can be denoted as $Face_{pro}$ and satisfy the following formula: $Face_{pro} = S_{face}/S_w$.

In the present embodiment, face region detection can be performed on a capturing screen of the camera, and the area of the person face region can be calculated according to a conventional algorithm.

Generally, the area of the whole captured picture can be known and determined according to settings.

In an embodiment, for a single person face currently captured by the camera, the second ratio can be a proportion of an area of the single person face in the whole captured picture.

In another embodiment, for a plurality of person faces currently captured by the camera, the second ratio can be a proportion of an area of a combined face region in the whole captured picture, and the area of the combined face region can be a sum of areas of the plurality of person faces.

In other words, a face ratio can be obtained by analyzing the proportion of the area of the person face area in the whole captured picture. For the single person face, for example, the proportion of the area of the single person face can be analyzed to obtain the face ratio. For the plurality of person faces, for example, the combined face region can be counted to calculate the face ratio in the whole picture.

It should be noted that the step of determining the second ratio for the single person face currently captured by the camera and the step of determining the second ratio for the plurality of person faces currently captured by the camera can be applied in the same embodiment, or in different embodiments. That is, when the second ratio for the single person face currently captured by the camera is obtained by the proportion of the area of the single person face in the whole captured picture, the second ratio for the plurality of person faces currently captured by the camera may be determined by the above proportion of the area of the combined face region in the whole captured picture, or may be determined by other method. The two steps may not be related, and vice versa.

At the step 103, determining whether the first ratio is less than or equal to a first ratio threshold and the second ratio is less than or equal to a second ratio threshold. The first ratio threshold can be N, the second ratio threshold can be M, and step 103 can be specifically to determine whether the first ratio $X_{oz}/X_z$ and the second ratio $Face_{pro}$ satisfy the following formula: $X_{oz}/X_z \leq N$ and $Face_{pro} \leq M$.

Alternatively, in an embodiment, N can be in a range from 0.45 to 0.55. For example, N can be 0.5, that is, ½. M can be in a range from 0.15 to 0.25. For example, M can be 0.2, that is, ⅕.

At the step 104, when the first ratio $X_{oz}/X_z$ and the second ratio $Face_{pro}$ satisfy the following formula: $X_{oz}/X_z \leq N$ and $Face_{pro} \leq M$, the camera can be controlled to perform optical zoom (denoted as "$S_{oz}$"). In other cases, the camera can be controlled to perform digital zoom (denoted by "$S_{dz}$").

In a specific embodiment, comprehensively considering the image quality after image scaling and a disappearance detection mechanism of the face after image enlargement, a scaling strategy denoted as S for the image scaling can be as follows:

$$S = \begin{cases} S_{oz}, \left(X_{oz} \leq \dfrac{X_z}{2}, Face_{pro} \leq \dfrac{1}{5}\right) \\ S_{dz}, \left(X_{oz} > \dfrac{X_z}{2}\right) \\ S_{dz}, \text{else} \end{cases}$$

The else refers to other conditions other than the above conditions.

In this way, when both the proportion of the area of the person face region in the whole captured picture and the current optical zoom ratio is small, optical zoom can be applied for image scaling. When the proportion of the area of the person face region in the whole captured picture is greater than a certain face threshold (i.e., the second ratio threshold), digital zoom can be applied for image scaling. In this way, a function of enlarging the face can be realized, and better image quality can be obtained. Moreover, it is conducive to realizing a rapid detection of the face in the panoramic picture after the face disappears.

It is understood that, in order to achieve fast adjustment for a portrait close-up, in the present embodiment, rapid image scaling can be achieved by analyzing a scaling ratio relationship between the proportion of the area of the person face region in the whole captured picture and the optical zoom ratio.

Figure 3:
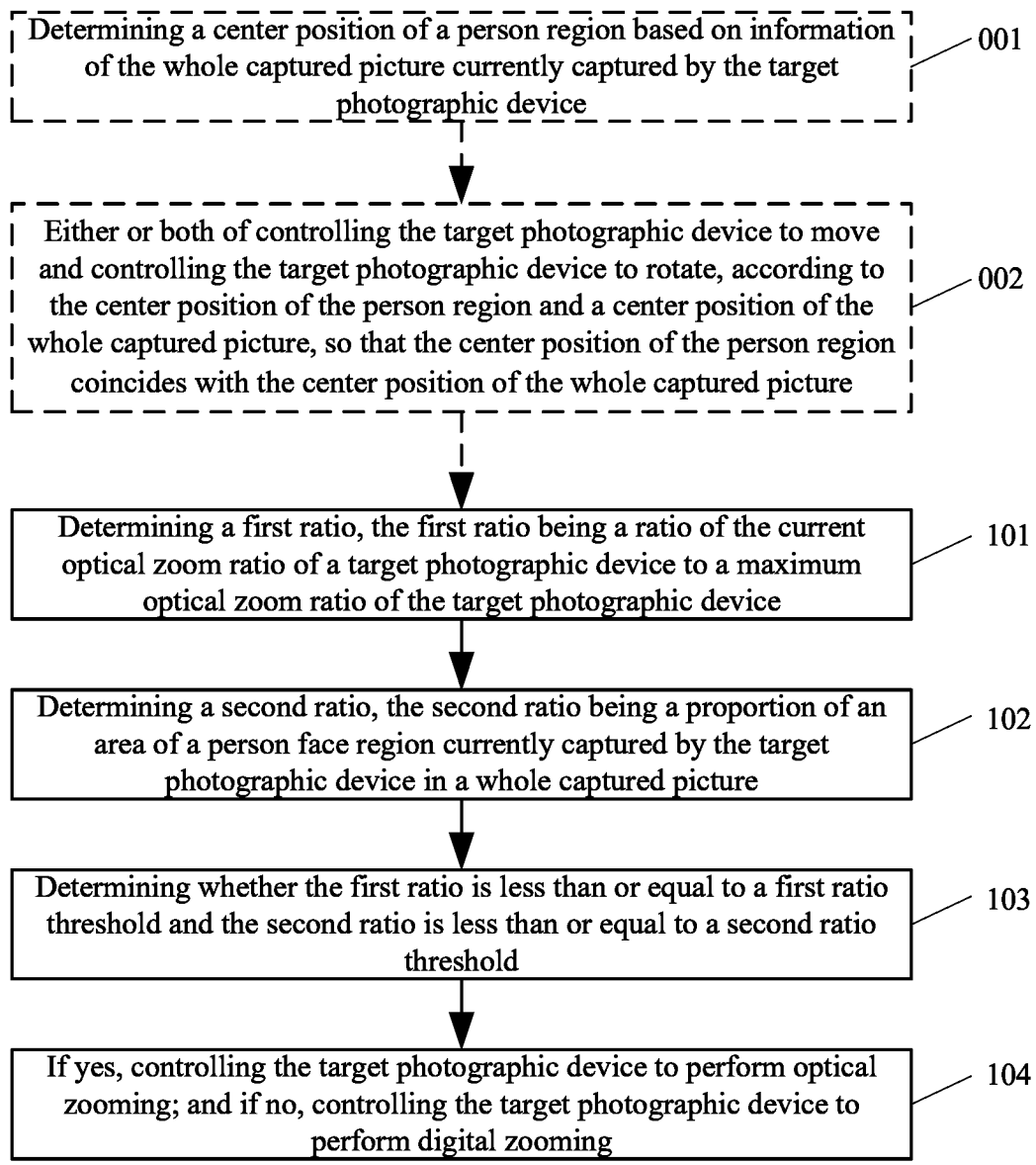
FIG. 3 is a flowchart of a photographing control method in another embodiment.

Referring to FIG. 3, in an alternative embodiment, the method further includes following steps:
- at step 001, determining a center position of a person region based on information of the whole captured picture currently captured by the target photographic device; and
- at step 002, either or both of controlling the target photographic device to move and controlling the target photographic device to rotate, according to the center position of the person region and a center position of the whole captured picture, so that the center position of the person region coincides with the center position of the whole captured picture.

In an alternative embodiment, the step of either or both of controlling the target photographic device to move and controlling the target photographic device to rotate can be performed before the step of determining the first ratio. That is, referring to FIG. 3, steps 101 to 104 can be performed after performing steps 001 to 002. In this way, after detecting the face region, the person region can be firstly adjusted to the center position of the whole captured picture based on the face region, and then the face can be scaled to a suitable size via a scaling function, so as to achieve a face focus.

The present disclosure is not limited herein, steps 001 to 002 and steps 101 to 104 may be performed separately. In this way, after detecting the face region, the face can be scaled to a suitable size via a scaling function. At this time, the person region can be ensured to be in the center position of the whole captured picture after scaled.

Since a whole captured picture currently captured by the target photographic device may include the single person face or the plurality of person faces. For a single person face, when moving the center position of the single person face to the center position of the whole captured picture, a focus demand of the face can be generally ensured. However, for the plurality of person faces, when the picture is displayed based on the center position of each face in the plurality of person faces, the portrait displayed in the picture may be incomplete due to a complex relationship such as a relative position between a front position and a back position in the plurality of person faces.

Based on this, in a specific embodiment, the determining the center position of the person region based on information of the whole captured picture currently captured by the target photographic device can include: for a single person face currently captured by the target photographic device, determining a center position of the single person face as the center position of the person region.

In another embodiment, the determining the center position of the person region based on information of the whole captured picture currently captured by the target photographic device can include: for the plurality of person faces currently captured by the target photographic device, determining a center position of a combined person body region as the center position of the person region. The combined person body region can be a closed region determined based on image boundaries of person bodies corresponding to the plurality of person faces, and the closed region covers images of person bodies.

In other words, the specific center position of the person region can be determined in different ways in the cases of the single person face and the plurality of person faces. In the case of the single person face, the specific center position of the person region can be determined based on the single person face. In the case of the plurality of person faces, the specific center position of the person region can be determined based on the image boundaries of person bodies.

It should be noted that determining the center position of the person region for the single person face currently captured by the target photographic device, and determining the center position of the person region for the plurality of person faces currently captured by the target photographic device can be applied in the same embodiment, or in different embodiments. That is, when the center position of the single person face is determined as the center position of the person region, the center position of the person region for the plurality of person faces currently captured by the target photographic device may be determined by the above center position of the combined person body region, or may be determined by other method. The two cases may not be related, and vice versa.

The image boundaries of person bodies can be determined by an image processing module provided inside or outside the target photographic device. The image boundaries of person bodies can be directly determined based on the information of the whole captured picture currently captured by the image processing module, or calculated based on an algorithm of the combined face region, which is not specifically limited herein.

The either or both of controlling the target photographic device to move and controlling the target photographic device to rotate, according to the center position of the person region and the center position of the whole captured picture can include:

determining a horizontal position offset angle based on an object distance and a horizontal offset between the center position of the person region and the center position of the whole captured picture;

determining a vertical position offset angle based on the object distance and a vertical offset between the center position of the person region and the center position of the whole captured picture; and controlling the target photographic device to rotate based on the horizontal position offset angle and the vertical position offset angle.

The object distance can be a distance between an actual position of a currently captured face and an actual position of the target photographic device.

The step of determining the horizontal position offset angle based on the object distance and the horizontal offset between the center position of the person region and the center position of the whole captured picture can specifically include calculating the horizontal offset denoted as $X_{off}$ between the center position of the person region and the center position of the whole captured picture, calculating a tangent function value denoted as $\arctan(X_{off}/S_d)$ of the horizontal position offset angle according to a ratio between $X_{off}$ and the object distance denoted as $S_d$, and calculating the horizontal position offset angle according to $\arctan(X_{off}/S_d)$.

The step of determining the vertical position offset angle based on the object distance and the vertical offset between the center position of the person region and the center position of the whole captured picture can specifically include calculating the vertical offset denoted as $Y_{off}$ between the center position of the person region and the center position of the whole captured picture, calculating a tangent function value denoted as $\arctan(Y_{off}/S_d)$ of the vertical position offset angle according to a ratio between $Y_{off}$ and the object distance $S_d$, and calculating the vertical position offset angle according to $\arctan(Y_{off}/S_d)$.

In the present embodiment, the horizontal position offset angle and the vertical position offset angle can include not only a value of the angle, but also a direction of the corresponding angle (e.g., the direction of the angle can be represented by a plus or minus symbol).

The step of controlling the target photographic device to rotate can specifically include controlling the rotation of the pan-tilt to drive the target photographic device to rotate.

In an alternative embodiment, the object distance can be determined based on the current optical zoom ratio of the target photographic device and the second ratio.

The present disclosure is further elaborated in conjunction with a specific embodiment.

An embodiment for the single person face currently captured by the target photographic device is as follows.

Figure 4:
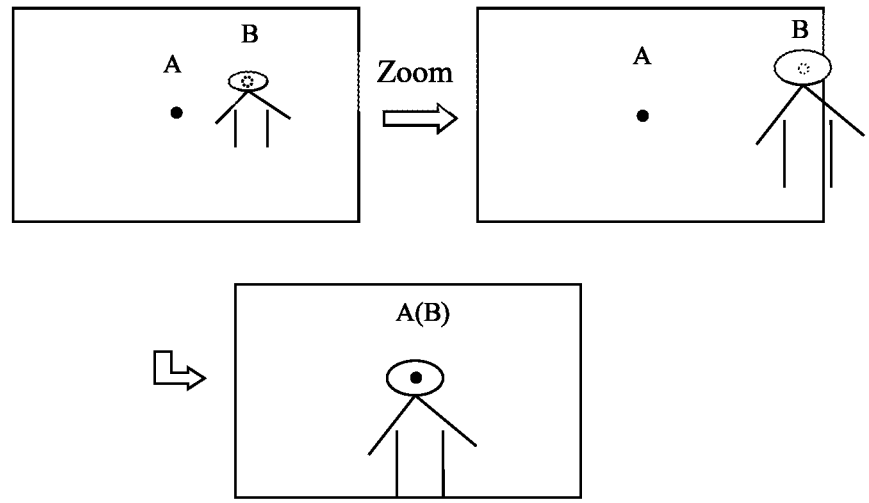
FIG. 4 to FIG. 7 are schematic diagrams of zoom screens in various embodiments.

Referring to FIG. 4, during a scaling process, when the face itself is at an edge of the picture, the face can be likely to disappear due to an increase of the zoom ratio. In FIG. 4, A represents the center position of a picture, and B represents the center position of the face region. Therefore, it is necessary to adjust the face to the center position of the picture before zoom, so as to ensure a good effect of face focus.

Figure 5:
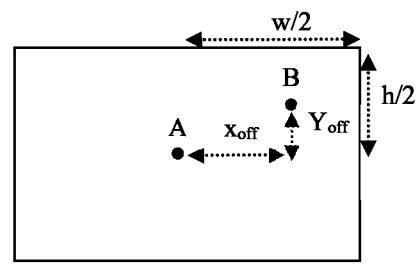

In the present embodiment, referring to FIG. 5, in order to ensure an effect of zoom, so that the face can be in the center position of the picture, a width and a height of the picture can be assumed to be w and h, respectively, then A can be located at a coordinate (w/2, h/2). B can be moved to the position of A according to the horizontal offset $X_{off}$ between B and A, and the vertical offset $Y_{off}$ between B and A.

An embodiment for the plurality of person faces currently captured by the target photographic device is as follows.

Figure 6:
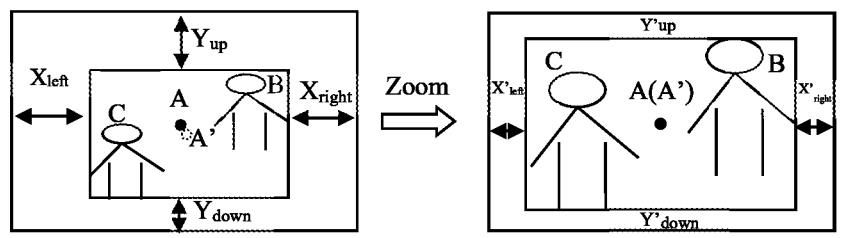

When the plurality of person faces is in the picture, it is necessary to balance a close-up effect of an overall portrait picture. In the present embodiment, referring to FIG. 6, an image of a plurality of person bodies can be taken as an overall area, where B and C respectively represent the center position of each person face in the plurality of person faces. When the person body regions corresponding to B and C are taken as the combined person body region, the center position of the combined person body region can be A' and an actual center position of the picture can be still A, then a position of A' can be adjusted to coincide with that of A.

Before the position of A' coincides with that of A, when distance differences between an upper, a lower, a left and a right of the combined person body region and corresponding boundaries of the captured picture are $Y_{up}$, $Y_{down}$, $X_{left}$, and $X_{right}$, respectively. After the position of A' coincides with that of A, distance differences between the upper, the lower, the left and the right of the combined person body region and corresponding boundaries of the captured picture can become $Y'_{up}$, $Y'_{down}$, $X'_{left}$, and $X'_{right}$, respectively. At this time, $Y'_{up}$, $Y'_{down}$, $X'_{left}$, and $X'_{right}$ satisfy the following formula: $Y'_{up}=Y'_{down}$ and $X'_{left}=X'_{right}$.

In order to ensure that the person region is centered the captured picture, the pan-tilt needs to move accurately, and an angle of movement of the pan-tilt needs to be calculated.

Figure 7:
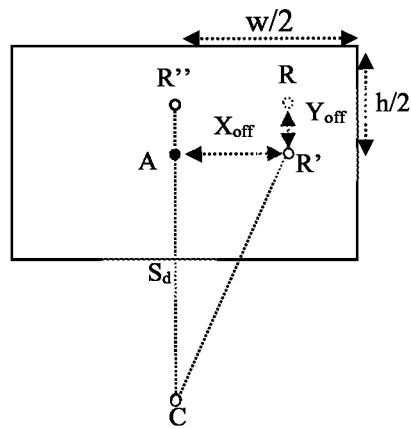

Referring to FIG. 7, the horizontal position offset angle denoted as ∠R'CA can be determined based on the object distance $S_d$ and the horizontal offset $X_{off}$ between the center position of the person region (denoted as R, i.e. R coincides with B in the embodiment for the single person face, R coincides with A' in the embodiment for the plurality of person faces) and the center position of the whole captured picture. ∠R'CA satisfies the following formula: ∠R'CA=arctan $(X_{off}/S_d)$. The vertical position offset angle denoted as ∠R"CA can be determined based on the object distance $S_d$ and the vertical offset $X_{off}$ between the center position of the person region and the center position of the whole captured picture. ∠R"CA satisfies the following formula: ∠R"CA=arctan $(Y_{off}/S_d)$ Furthermore, the pan-tilt can be driven to move according to the horizontal position offset angle, the vertical position offset angle, combined with an offset between the center position of the person region and the center position of the whole captured picture.

In the present embodiment, the object distance $S_d$ can be obtained by calculating the proportion of the area of the person face region (i.e., the second ratio), the current optical zoom ratio a focus motor, and a position of the focus motor.

In an alternative embodiment, the method can further include pre-establishing a correspondence among the object distance $S_d$, different optical zoom ratios of the target photographic device and different second ratios, and determining the object distance according to the correspondence.

Figure 8:
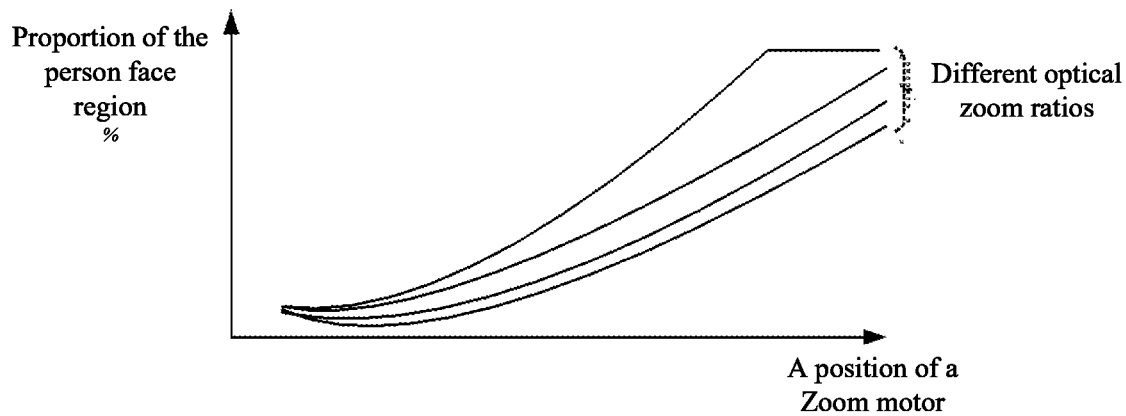
FIG. 8 is a schematic diagram of a relationship among an object distance, an optical zoom magnification, and a proportion of a person face region in an embodiment.

It is understood that the proportions of the areas of the person face region can be different at different optical zoom ratios. Even at the same optical zoom ratio, the proportions of the areas of the person face region corresponding to persons at different distances can be different. Specifically, in the case of the same optical zoom ratio, a proportion of the area of the person face region at a long distance can be small, and a proportion of the area of the person face region at a short distance can be great. Therefore, a relationship table or a relationship diagram can be constructed among different object distances, different current optical zoom ratios of the target photographic device and different second ratios, which is conducive to quickly determining the current corresponding object distance. FIG. 8 is a schematic relationship diagram of the relationship among the object distance, the optical zoom ratio and the proportion of the person face region. In the FIG. 8, a position of a Zoom motor corresponds to the object distance.

In an alternative embodiment, after the controlling the target photographic device to perform optical zoom or controlling the target photographic device to perform digital zoom, a ratio of an area of the person region in a display screen of the target photographic device to a total area of the display screen can be in a range from 0.7 to 0.8.

For the single person face currently captured by the target photographic device, the area of the person region can be an area of image region of a person body corresponding to the single person face.

For the plurality of person faces currently captured by the target photographic device, the area of the person region can be an area of the combined person body region, the combined person body region can be the closed region determined based on image boundaries of person bodies corresponding to the plurality of person faces, and the closed region covers images of person bodies.

In a specific embodiment, the ratio of the area of the person region in the display screen of the target photographic device to the total area of the display screen can be 0.75.

It is understood that, in order to ensure that the portrait is well scaled, a suitable scale range can be provided in the present embodiment, so that the lens of the target photographic device is able to adaptively focus and scale.

In an alternative embodiment, the area of image region of the person body can be determined based on an area of a corresponding region of the single person face and a preset multiplier. The preset multiplier can be a preset ratio of the area of image region of the person body to the area of the person face region.

Figure 9:
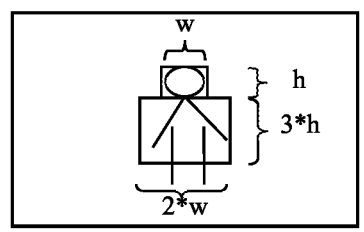
FIG. 9 is a schematic diagram of an image region of a person body and a person face region in an embodiment.

Specifically, referring to FIG. 9, according to a golden section proportion of the person body, a height of an ordinary person in a sitting position can be 5 times of a length of a head thereof, and a height of the ordinary person in a standing position can be 7.5 times of the length of the head thereof. An upper part of the human body can be paid more attention no matter in the standing position or the sitting position during a video conference scene. Therefore, in an alternative embodiment, a width of the person body can be 2 times of a width of the person face denoted as w, that is, the width of the person body can be 2*w. A height of a part of the person body other than the head can be 3 times a height of the person face denoted as h, that is, the height of the person body can be 4*h. In this way, the area of image region of the person body can be determined. In the present embodiment, the preset multiplier can be 8, that is, the area of image region of the person body can be calculated by the area of the corresponding single person face multiplied by 8 times.

When the determination result at step 103 is yes, after the controlling the target photographic device to perform optical zoom, the method further includes the following step:
  performing face region detection on the display screen of the target photographic device;
  when no face region is detected in the display screen, controlling the target photographic device to perform an optical zoom backoff and back to half the current optical zoom ratio of the target photographic device;

performing face region detection on the display screen of the target camera device after the optical zoom backoff is performed; and when no face region is detected in the display screen of the target photographic device after the optical zoom backoff is performed, controlling the target photographic device to perform another optical zoom backoff and back to a wide-angle end.

When the determination result at step 103 is no, after the controlling the target photographic device to perform digital zoom, the method further includes the following step:

performing face region detection on the display screen of the target photographic device; and when no face region is detected in the display screen, determining whether the person face region is in the whole captured picture;

if yes, adjusting the display screen to display the person face region; and if no, controlling the target photographic device to perform digital zoom backoff and optical zoom backoff.

It is understood that after focus the person face by zoom, it needs to ensure that how to quickly back to an appropriate zoom ratio when the person face disappears.

In practice, backoff methods can be divided into a method of digital zoom backoff (1) and a method of optical zoom backoff (2).

Figure 10:
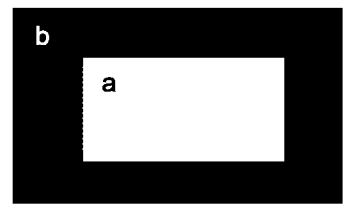
FIG. 10 is a schematic diagram of a picture region with digital zoom in an embodiment.

(1) The method of digital zoom backoff can be performed hereinafter. Referring to FIG. 10, a screen can be enlarged by the digital zoom via cropping a center of the screen, and an area denoted as a can be an area where the enlarged screen is located. An outer boundary of an area denoted as b can be a boundary of the screen (an initial screen) before the screen is enlarged by the digital zoom. An inner boundary of the area b can be an outer boundary of the area a, so that the area b can be an area that has been cropped during the digital zoom and not displayed. When the face in the area a disappears, in typical cases, it is necessary to perform a zoom backoff for the face region detection. In the present embodiment, a rapid face region detection can be performed temporarily by a method of not zoom backoff. Specifically, the face region detection can be performed by detecting the initial screen retained by each frame. In most cases, when the face moves to the area b, that is, the face moves between the area a and the boundary of the initial screen, a position of the face region can be quickly locked by detecting the area b. A phenomenon of back-and-forth zoom and vibration of the screen caused by the large-scale zoom backoff can be avoided, and a second lock of the close-up of the face region can be accelerated. When no face region is detected in the area b, digital zoom backoff can be immediately performed, while optical zoom backoff is performed. The face region can be locked again by performing the method of optical zoom backoff.

Figure 11:
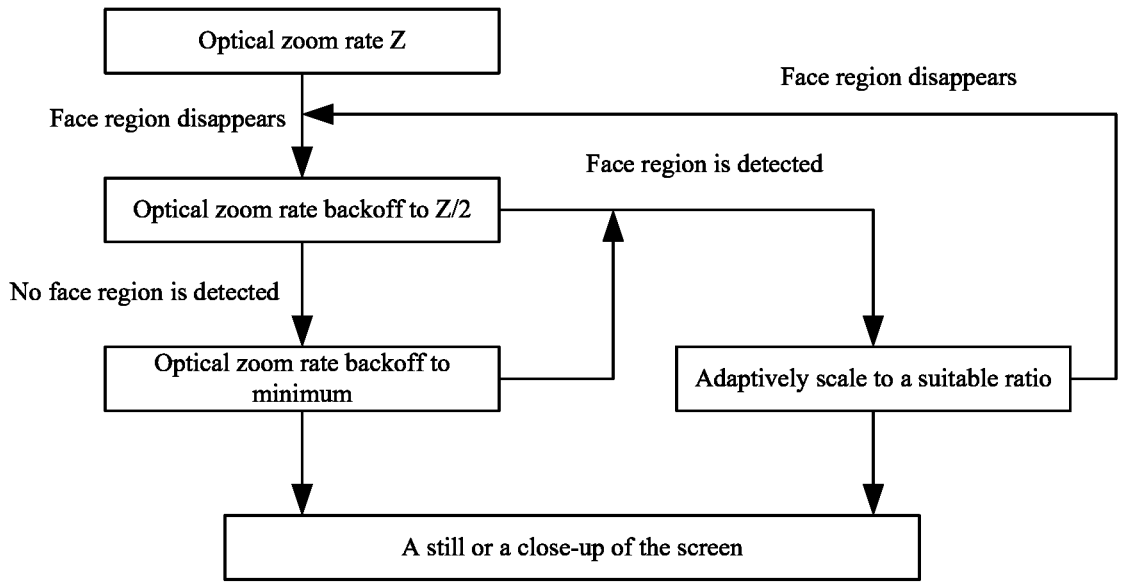
FIG. 11 is a flowchart of an optical zoom backoff method in an embodiment.

(2) The method of optical zoom backoff can be performed hereinafter. Referring to FIG. 11, in present embodiment, the current optical zoom ratio can be Z. When the face region disappears, the zoom backoff can be performed as following steps. The optical zoom ratio can be controlled rapidly back to half the current optical zoom ratio, that is, Z/2. Then face region detection can be performed. When no face region is detected again, the optical zoom ratio can quickly back to the wide-angle end, that is, the optical zoom ratio can back to the minimum value. Then face region detection can be performed. When the face region is detected, the target photographic device is able to adaptively scale to a suitable ratio according to the method provided in the above embodiments of the present disclosure. When the face region disappears, the optical zoom ratio can be controlled back to Z/2 again. In addition, a still or a close-up of the screen can be performed. In this way, not only can an excessive face scaling caused by an excessive zoom backoff be avoided, but also time spent on a movement of the lens can be reduced, thereby avoiding a problem that the movement of the lens takes too long.

In this way, a photographing control method in the present embodiment can be performed to adaptively focus and scale the screen based on the face region detection, and to achieve the accurate zoom backoff by the above fast zoom backoff strategy when the face disappears.

Figure 12:
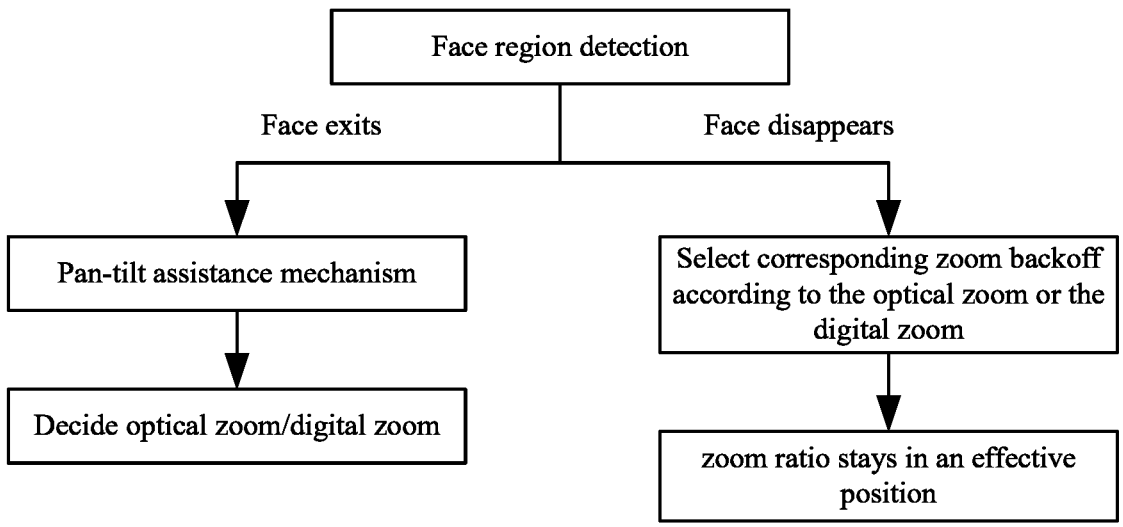
FIG. 12 is a flowchart of a photographing control method in a specific embodiment.

In a specific embodiment, referring to FIG. 12, firstly, the face region detection can be performed by a face detection technology. When a face is detected, that is, a face exits in the picture, the center position of the person region can be adjusted to coincide with the center position of the whole captured picture via a pan-tilt assistance mechanism. Specifically, the proportions of the areas of the person face region can be calculated according to different situations including the single person face or the plurality of person faces. The target photographic device can move with the assistance of the pan-tilt according to the offset between the center position of the person region and the center position of the whole captured picture, so that the center position of the person region can coincide with the center position of the whole captured picture. An adaptive scaling can be performed with a suitable method of the optical zoom and/or the digital zoom according to the current zoom ratio combined with the scaling strategy. A real-time detection of face region can be performed. When the face disappears, the zoom backoff can be performed according to the method of the fast zoom backoff, that is, according to the zoom backoff strategy corresponding to the optical zoom or the digital zoom. It can be ensured that the face can be quickly tracked while the face disappears, and the accurate zoom backoff can be achieved. The camera can adaptively zoom to an appropriate position, i.e., the zoom ratio stays in an effective position.

It can be seen that the present embodiment provides the adaptive zoom technology based on the single camera, the camera can adaptively scale via an analysis of the face region and quickly zoom to a suitable ratio. In a zoom process, the pan-tilt can be comprehensively considered to fine-tune the position of the person face, so as to ensure the region of the single person face or the plurality of person faces in the center of the whole captured picture. In order to ensure the image quality and the adaptive scaling simultaneously as much as possible, it is decided whether to perform the digital zoom or the optical zoom according to the zoom ratio of the camera and the proportions of the areas of the person face region. In addition, the efficient zoom backoff strategy can be provided in the present embodiment to solve a problem of the zoom backoff of the single camera after the face disappears. A fast close-up of the face region can be realized by the efficient adaptive zoom technology for the single camera provided in this embodiment.

The optical zoom realizes image scaling by movement of the focus lens group, and the image quality would not be lost. The focus lens group relates to an auto-focus technology. The current auto-focus technology has been widely applied in a digital camera field, a security monitoring field, a mobile phone field, a video conferencing field, and other fields. In the field of security monitoring, the auto-focus technology can typically achieve focus via an image analysis. The image analysis can include obtaining a current frame, analyzing a definition value of an image, calculating a next focus position and a definition value, and constantly driving the focus motor until the best definition value is found. However, during a focus process, a typical focus method has a problem of focus back and forth near a peak point, resulting in a slow focus speed and reduced focus efficiency.

Figure 13:
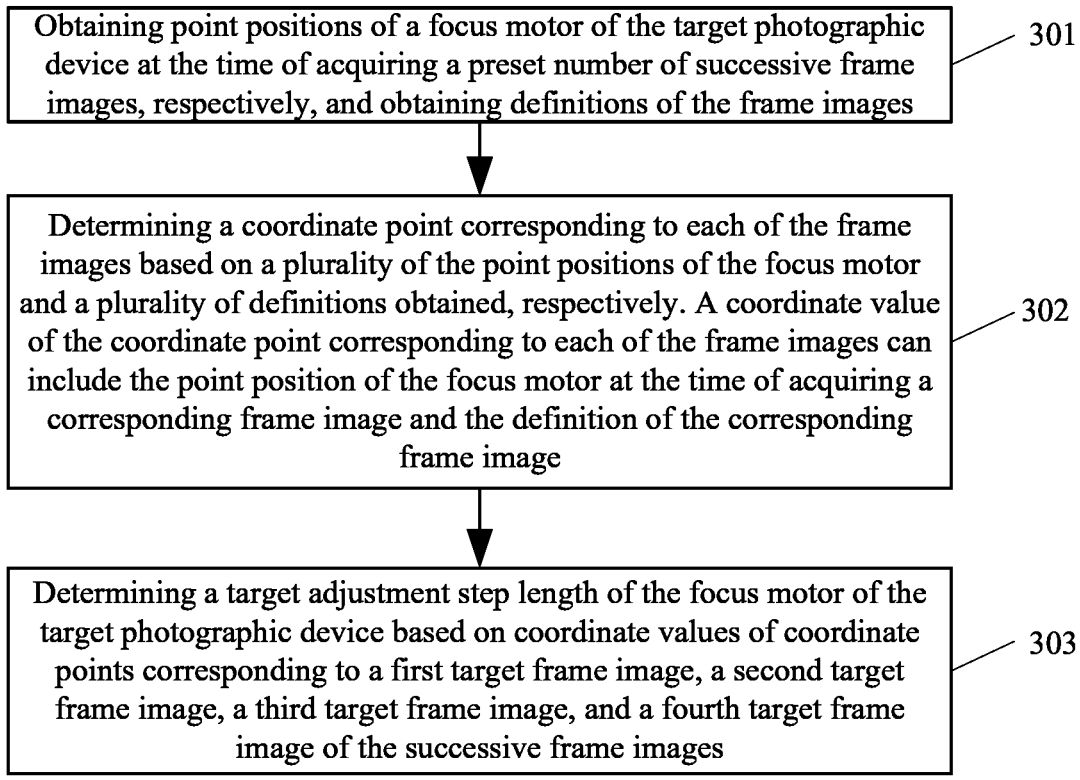
FIG. 13 is a flowchart of a method of determining a focus step length according to an embodiment of the present disclosure.

In an alternative embodiment, when controlling the target photographic device to perform optical zoom, a method of determining a focus step length can be provided. FIG. 13 is a flowchart of a method of determining the focus step length according to an embodiment of the present disclosure, as shown in FIG. 13, the method can include the following step 301 to step 303.

Step 301 can include obtaining point positions of a focus motor of the target photographic device at the time of acquiring a preset number of successive frame images, respectively, and obtaining definitions of the frame images.

In the present embodiment, the point positions of the focus motor corresponding to each of the frame images and definitions of the frame images can be recorded for subsequent calculations, respectively, when the frame images are acquired by the target photographic device.

The point positions of the focus motor can include a focus step length, a brightness and other information when the target photographic device acquires a certain frame image. The point positions of the focus motor and the definitions of the frame images can be obtained by storing the point positions of the focus motor and the definitions of the frame images in a target area, and then retrieving from the target area. The preset number of successive frame images can include at least 4 frames of images.

It should be noted that the step of obtaining the point positions of the focus motor of the target photographic device at the time of acquiring a preset number of successive frame images, respectively, and obtaining definitions of the frame images can be performed before the target photographic device captures the image. That is, the image can be captured after the focus, so as to obtain the image with a higher definition. The images can include pictures and/or videos.

Step 302 can include determining a coordinate point corresponding to each of the frame images based on a plurality of the point positions of the focus motor and a plurality of definitions obtained, respectively. A coordinate value of the coordinate point corresponding to each of the frame images can include the point position of the focus motor at the time of acquiring a corresponding frame image and the definition of the corresponding frame image.

In the present embodiment, the coordinate point can be determined to facilitate positioning of the point positions of the focus motor for each of the frame images when focus by a climbing algorithm, thereby facilitating a determination of a curve diagram of the climbing algorithm.

The point positions of the focus motor can be corresponded to the definitions one-to-one, so as to form a two-dimensional coordinate system. Then the point positions of the focus motor can be connected by curves to determine the curve diagram of the climbing algorithm.

Step 303 can include determining a target adjustment step length of the focus motor of the target photographic device based on coordinate values of coordinate points corresponding to a first target frame image, a second target frame image, a third target frame image, and a fourth target frame image of the successive frame images. The fourth target frame image can be a frame image before the third target frame image. The third target frame image, the second target frame image, the first target frame image can be sequentially adjacent frame images. The first target frame image can be the last frame image of the successive frame images.

In the present embodiment, the target adjustment step length of the focus motor of the target photographic device can be determined based on coordinate values of coordinate points of at least 4 frames of the target frame images, which can shorten a repeated debugging process of the target adjustment step length, thereby reducing the time spent in the focus process and improving the focus efficiency.

The target adjustment step length can be adjusted according to actual needs, such as 1 or other values. The fourth target frame image can be a frame image adjacent to the third target frame image or a frame image that is not adjacent to the third target frame image.

With the above steps, the focus step length can be adjusted according to the coordinate values of coordinate points of the successive frame images, so that the target photographic device can focus quickly, thereby reducing the time spent in the focus process, solving a problem of low focus efficiency in the related art, and improving the focus efficiency.

In an alternative embodiment, the determining the target adjustment step length of the focus motor of the target photographic device based on coordinate values of coordinate points corresponding to the first target frame image, the second target frame image, the third target frame image, and the fourth target frame image of the successive frame images can further include the following step 3031 to step 3033.

The step 3031 can include determining a first angle change value and a first residual change rate of a first coordinate point based on a first coordinate value, a second coordinate value, and a fourth coordinate value. The first coordinate value can be a coordinate value of the first coordinate point corresponding to the first target frame image, the second coordinate value can be a coordinate value of a second coordinate point corresponding to the second target frame image, and the fourth coordinate value can be a coordinate value of a fourth coordinate point corresponding to the fourth target frame image. The first angle change value can be an amount of change between a first average definition value per step and a second average definition value per step. The first average definition value per step can be an average definition value per step between the first target frame image and the fourth target frame image. The second average definition value per step can be an average definition value per step between the first target frame image and the second target frame image. The first residual change rate can be configured to indicate a change rate of definition per step between the first target frame image and the second target frame image.

The step 3032 can include determining a second angle change value and a second residual change rate of a second coordinate point based on the second coordinate value, a third coordinate value, and the fourth coordinate value. The third coordinate value can be a coordinate value of a third coordinate point corresponding to the third target frame image. The second angle change value can be an amount of change between a third average definition value per step and a fourth average definition value per step. The third average definition value per step can be an average definition value per step between the second target frame image and the fourth target frame image. The fourth average definition value per step can be an average definition value per step between the second target frame image and the third target frame image. The second residual change rate can be configured to indicate a change rate of definition per step between the second target frame image and the third target frame image.

The step 3033 can include determining the target adjustment step length of the focus motor of the target photographic device based on the first angle change value, the first residual change rate, the second angle change value, and the second residual change rate.

In the present embodiment, the first angle change value and the second angle change value can be determined to obtain an angle change between the coordinate points of two adjacent frame images, so as to determine whether the definition value exceeds or is about to reach a focus peak. When the definition value exceeds the focus peak, the second angle change value may be greater than the first angle change value. At this time, it can be determined that the focus peak is located at the left of the point position of the focus motor corresponding to the first target frame image, so that a position of the focus peak can be quickly predicted, and so on. Similarly, the first residual change rate and the second residual change rate can be determined to obtain a change of the definition between two adjacent frame images, so as to quickly determine the position of the focus peak.

Figure 14:
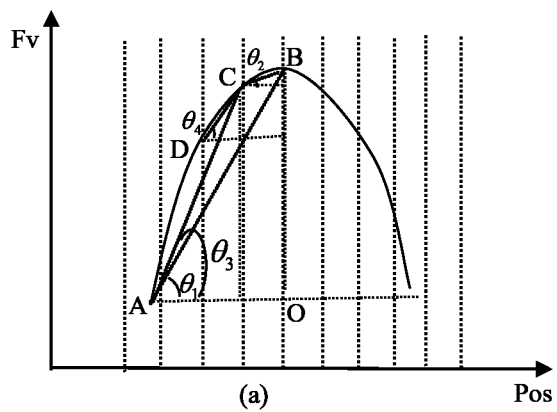
FIG. 14 is a schematic diagram of a hill climbing focus curve according to an embodiment of the present disclosure.

In an embodiment, referring to FIG. 14, the first target frame image can be a frame image in which the point position of the focus motor is at a point B, the second target frame image can be a frame image in which the point position of the focus motor is at a point C, the third target frame image can be a frame image in which the point position of the focus motor is at a point D, the fourth target frame image can be a frame image in which the point position of the focus motor is at a point A, and the first angle change value and the second angle change value can be calculated according to the following formulas:

$$f\_radio1 = \frac{Fv\_cur - Fv\_init}{Fv\_init} \cdot Radio \quad (1)$$

$$f\_radio2 = \frac{Fv\_cur - Fv\_bef}{Fv\_bef} \cdot Radio$$

$$diff\_pos1 = Pos\_cur - Pos\_init$$

$$diff\_pos2 = Pos\_cur - Pos\_bef$$

$$\theta1 = \arctan\left(\frac{f\_radio1}{diff\_pos1}\right) \quad (2)$$

$$\theta2 = \arctan\left(\frac{f\_radio2}{diff\_pos2}\right)$$

$$\theta_{diff} = \theta1 - \theta2 = \arctan\left(\frac{diff\_pos1 \cdot f\_radio2 + diff\_pos2 \cdot f\_radio1}{diff\_pos1 \cdot diff\_pos2 + f\_radio1 \cdot f\_radio2}\right)$$

$$f\_radio = \frac{diff\_pos1 \cdot f\_radio2 + diff\_pos2 \cdot f\_radio1}{diff\_pos1 \cdot diff\_pos2 + f\_radio1 \cdot f\_radio2}$$

In the formula (1), Fv_cur represents the definition of the current frame image (i.e., the first target frame image), Fv_init represents the definition of an initial frame image (i.e., the fourth target frame image), Fv_bef represents the definition of a previous frame image (i.e., the second target frame image), Pos_cur represents the focus step length of the current frame image (i.e., the first target frame image), Pos_init represents the focus step length of the initial frame image (i.e., the fourth target frame image), Pos_bef represents the focus step length of the previous frame image (i.e., the second target frame image), Radio represents a parameter, f_radio1 represents a definition change rate of the first target frame image and the second target frame image respectively relative to the fourth target frame image, i.e., the first average definition value per step, and f_radio2 represents a definition change rate of the second target frame image and the third target frame image respectively relative to the fourth target frame image, i.e., the second average definition value per step. In a normal climbing algorithm, f_radio2 is usually used to measure the definition whether to reach the focus peak. When f_radio2<0, it represents that the curve is on a downward trend, i.e., the definition of the current frame image is over the peak point. In order to avoid encountering a false wave peak, a certain threshold would be set to limit the curve. When f_radio2>0, it represents that the curve is on an upward trend, but it is difficult to qualify whether it is already proximal to a stable peak point. Therefore, it is necessary to perform additional judgment via the formula (2). In the formula (2), the smaller the angle defined with the previous frame ($\theta_2 > \theta_4$), and the smaller the angle defined with an initial frame ($\theta_1 < \theta_3$), the smaller the angle difference denoted as $\theta_{diff}$ and more proximal to the peak. The formula with f_radio is a formula for calculation of the first angle change value and the second angle change value.

The first residual change rate and the second residual change rate can be calculated by the following formulas:

$$fv\_radio1 = \frac{Fv\_cur - Fv\_bef}{Fv\_bef \cdot Step\_cur} \cdot Radio \quad (3)$$

$$fv\_radio2 = \frac{Fv\_bef - Fv\_bef'}{Fv\_bef' \cdot Step\_bef} \cdot Radio$$

$$fv\_radio = fv\_radio1 - fv\_radio2$$

In the formula (3), fv_radio1 represents the first residual change rate, fv_radio2 represents the second residual change rate, Fv_cur represents the definition of the current frame image, Fv_bef represents the definition of the previous frame image, Fv_bef' represents the definition of the more previous frame image, Step_cur represents a walking step length of the current frame image relative to the previous frame image, Step_bef represents the focus step length of the current frame image, and fv_radio represents a change rate of definition per step between adjacent frame images, i.e., a residual change rate.

In an alternative embodiment, the determining the target adjustment step length of the focus motor of the target photographic device based on the first angle change value, the first residual change rate, the second angle change value, and the second residual change rate can further include:

at step 30331, determining a first difference value between the first angle change value and the second angle change value;

at step 30332, determining a second difference value between the first residual change rate and the second residual change rate; and at step 30333, determining the target adjustment step length of the focus motor of the target photographic device based on the first difference value and the second difference value.

In the present embodiment, the first difference value is to determine the changes among the angle change values of adjacent frame images, and the second difference value is to determine the changes in definition of adjacent frame images.

The second difference value can be fv_radio in the formula (3), and $$\text{fv\_radio} = \begin{cases} > 0, \text{ indicating } FV \text{ is on an upward trend} \\ < 0, \text{ indicating } FV \text{ is on an downward trend} \end{cases} \quad (4)$$

Referring to the formula (4), when fv_radio is greater than 0, it indicates that the definition is on an upward trend of the curve. When fv_radio is less than 0, it indicates that a search region has reached a plateau and is approaching the focus peak.

The first different value denoted as f_radio_diff can be calculated by the following formula:

$$\begin{aligned}
\text{f\_radio\_diff} &= \text{f\_radio\_B} - \text{f\_radio\_C} \\
&= \frac{f_b \cdot (p_b - p_c) + (f_b - f_c) \cdot p_b}{p_b \cdot (p_b - p_c) - f_b \cdot (f_b - f_c)} - \frac{(f_b - f_c) \cdot (p_c - p_d) + (f_c - f_d) \cdot (p_c - p_d)}{(p_b - p_c) \cdot (p_c - p_d) - (f_b - f_c) \cdot (f_c - f_d)} \\
&= \frac{f_b \cdot (p_b - p_c)^2 \cdot (p_c - p_d) - (f_b - f_c)^2 \cdot (f_c - f_d) - f_b \cdot (f_b - f_c)^2 \cdot (p_c - p_d) + (f_c - f_d) \cdot (f_b - f_c)^2 \cdot (p_c p_d)}{(p_b \cdot (p_b - p_c) - f_b \cdot (f_b - f_c)) \cdot ((p_b - p_c) \cdot (p_c - p_d) - (f_b - f_c) \cdot (f_c - f_d))} \\
&= \frac{(p_b - p_c)^2 \cdot [f_b \cdot (p_c - p_d) + f_c \cdot p_d] + f_c^2 \cdot [f_b \cdot (p_c - p_d) - f_d \cdot p_b]}{(p_b \cdot (p_b - p_c) - f_b \cdot (f_b - f_c)) \cdot ((p_b - p_c) \cdot (p_c - p_d) - (f_b - f_c) \cdot (f_c - f_d))}
\end{aligned} \quad (5)$$

In the formula (5), f_radio_B represents an angle of the point position of the focus motor in the frame image corresponding to B, f_radio_C represents an angle of the point position of the focus motor in the frame image corresponding to C, $f_b$ represents the definition corresponding to B, $f_c$ represents the definition corresponding to C, $f_d$ represents the definition corresponding to D, $P_b$ represents a position difference between B and an initial point, $P_c$ represents a position difference between C and the initial point, and $P_d$ represents a position difference between D and the initial point.

When the value of f is much greater than the value of p, and the definition of the frame image does not reach the focus peak, $f_b > f_c > f_d$, $P_b > P_c > P_d$. When the definition of B is over the focus peak, $f_c > f_b$.

Referring to the formula (4), $f_c^2 \cdot [f_b \cdot (p_c - p_d) - f_d \cdot p_b]$ would affect f_radio_diff, thus an advance judgment of convergence point validation can be performed. In other words, when B does not reach the focus peak, f_radio_diff≥0. When B is proximal to the focus peak, f_radio_diff<0.

It should be noted that an execution order of the step 30331 and the step 30332 can be switched, i.e., the step 30332 can be executed first, followed by the step 30331.

In an alternative embodiment, the determining the target adjustment step length of the focus motor of the target photographic device based on the first difference value and the second difference value can further include:
- at step 303331, determining a target convergence value based on the first difference value and the second difference value; and
- at step 303332, determining the target adjustment step length based on the target convergence value.

In the present embodiment, the target convergence value is to determine whether the definition of the frame image is over the focus peak or proximal to the focus peak, and subsequently to determine the target adjustment step length, so that a subsequent focus process can reach the focus peak quickly.

The target convergence value can be determined by the following formula:

$$\text{flag\_near\_peak} = \begin{cases} 1, \text{ (condition } A) \text{ or (condition } B) \text{ or (condition } C) \\ 0, \text{ else} \end{cases} \quad (6)$$

In the formula (6), the condition A can be fv_radio<0 & &f_radio_diff>default_radio1, the condition B can be f_radio_diff<0 & &f_radio_C>0, the condition C can be f_radio2<default_radio2, the default_radio1 can be 5, and the default_radio2 can be −25.

In an alternative embodiment, the determining the target adjustment step length based on the target convergence value can further include:
- at step 3033321, when the target convergence value satisfies a first condition, determining the target adjustment step length to be a preset step value; and
- at step 3033322, when the target convergence value does not satisfy the first condition, determining the target adjustment step length to be an initial step.

The initial step is a step used by the target photographic device in acquiring the preset number of the successive frame images.

In the present embodiment, the first condition can be (but not limited to) the following formula:

$$\text{step\_adjust} = \begin{cases} 1, & \text{flag\_near\_peak} = 1 \\ \text{else}, & \text{flag\_near\_peak} = 0 \end{cases} \quad (7)$$

When the convergence condition is not reached, i.e., flag_near_peak=0, the focus step length can be the same as an original setting, otherwise the focus step length can be 1.

In an alternative embodiment, after the determining the target adjustment step length of the focus motor of the target photographic device, the method can further include:
- at step 304, performing focus to the target photographic device based on the target adjustment step length.

In the present embodiment, the focus can be (but not limited to) acquisition and definition recording of the frame images reciprocated in accordance with the target adjustment step length, and the definition reaching the focus peak.

It should be understood that while the individual steps in each of the above flowcharts are shown sequentially as indicated by the arrows, these steps are not necessarily executed sequentially in the order indicated by the arrows. Unless expressly stated herein, no strict order limitation is on the execution of these steps, and these steps may be executed in other orders. Moreover, at least a portion of the steps in each of the above flowcharts may include multiple steps or phases, which are not necessarily executed at the same moment of completion, but may be executed at different moments, and the order of execution of these steps or phases is not necessarily sequential, but may be executed in turn or alternately with at least a portion of other steps or phases in other steps.

In the above description of the embodiments, it is clear to those skilled in the art that the method according to the above embodiments may be realized with the aid of software plus the necessary general-purpose hardware platform, or by means of hardware, but in many instances the former is the preferred embodiment. Based on this understanding, the technical solution of the present disclosure essentially or contributing to the related art may be embodied in the form of a software product, which is a computer software product stored in a storage medium (e.g., ROM/RAM, disk, CD-ROM). The computer software product can include several instructions to enable a terminal device (which may be a cellular phone, a computer, a server, a network device, etc.) to perform the method described in the various embodiments of the present disclosure.

Figure 15:
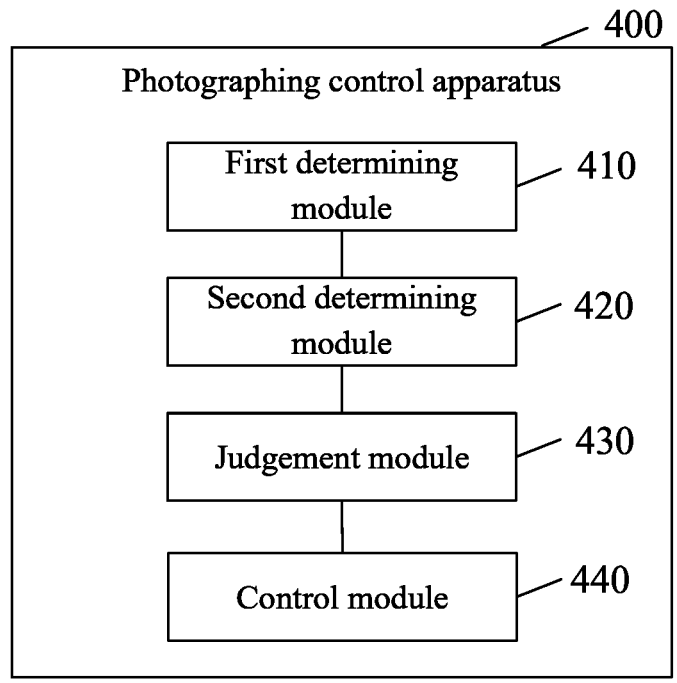
FIG. 15 is a schematic diagram of a photographing control apparatus according to an embodiment of the present disclosure.

Base on the above contents, referring to FIG. 15, the present disclosure can further provide a photographing control apparatus 400. The apparatus 400 includes a first determining module 410, a second determining module 420, a judgement module 430, and a control module 440. The first determining module 410 is configured for determining a first ratio, and the first ratio is a ratio of the current optical zoom ratio of a target photographic device to a maximum optical zoom ratio of the target photographic device. The second determining module 420 is configured for determining a second ratio, the second ratio is a proportion of an area of a person face region currently captured by the target photographic device in a whole captured picture. The judgement module 430 is configured for determining whether the first ratio is less than or equal to a first ratio threshold and the second ratio is less than or equal to a second ratio threshold. The control module 440 is configured for controlling the target photographic device to perform optical zoom when a judgement result is yes and controlling the target photographic device to perform digital zoom when the judgement result is no.

In an alternative embodiment, for a single person face currently captured by the target photographic device, the second ratio is a proportion of an area of the single person face in the whole captured picture. For a plurality of person faces currently captured by the target photographic device, the second ratio is a proportion of an area of a combined face region in the whole captured picture. The area of the combined face region is a sum of areas of the plurality of person faces.

In an alternative embodiment, the first ratio threshold is in a range from 0.45 to 0.55.

In an alternative embodiment, the second ratio threshold is in a range from 0.15 to 0.25.

In an alternative embodiment, the apparatus 400 can further include a third determining module. The third determining module is configured for determining a center position of a person region based on information of the whole captured picture currently captured by the target photographic device. The control module 440 is further configured for either or both of controlling the target photographic device to move and controlling the target photographic device to rotate, according to the center position of the person region and a center position of the whole captured picture, so that the center position of the person region coincides with the center position of the whole captured picture.

In an alternative embodiment, the control module 440 is further configured for either or both of controlling the target photographic device to move and controlling the target photographic device to rotate before the first determining module 410 determines the first ratio, so that the center position of the person region coincides with the center position of the whole captured picture.

In an alternative embodiment, the third determining module is specifically configured for determining a center position of the single person face as the center position of the person region for a single person face currently captured by the target photographic device, and determining a center position of a combined person body region as the center position of the person region for a plurality of person faces currently captured by the target photographic device. The combined person body region is a closed region determined based on image boundaries of person bodies corresponding to the plurality of person faces, and the closed region covers images of person bodies.

In an alternative embodiment, the control module 440 is specifically configured for determining a horizontal position offset angle based on an object distance and a horizontal offset between the center position of the person region and the center position of the whole captured picture; determining a vertical position offset angle based on the object distance and a vertical offset between the center position of the person region and the center position of the whole captured picture; and controlling the target photographic device to rotate based on the horizontal position offset angle and the vertical position offset angle. The object distance is a distance between an actual position of a currently captured face and an actual position of the target photographic device.

In an alternative embodiment, the object distance is determined based on the current optical zoom ratio of the target photographic device and the second ratio.

In an alternative embodiment, after the controlling the target photographic device to perform optical zoom or controlling the target photographic device to perform digital zoom, a ratio of an area of a person region in a display screen of the target photographic device to a total area of the display screen is in a range from 0.7 to 0.8. For a single person face currently captured by the target photographic device, the area of the person region is an area of image region of a person body corresponding to the single person face. For a plurality of person faces currently captured by the target photographic device, the area of the person region is an area of a combined person body region, the combined person body region is a closed region determined based on image boundaries of person bodies corresponding to the plurality of person faces, and the closed region covers images of person bodies.

In an alternative embodiment, the area of image region of the person body is determined based on an area of a corresponding region of the single person face and a preset multiplier, and the preset multiplier is a preset ratio of the area of image region of the person body to the area of the person face region.

In an alternative embodiment, the apparatus 400 can further include a backoff module. The backoff module is configured for performing face region detection on a display screen of the target photographic device after the controlling the target photographic device to perform optical zoom; when no face region is detected in the display screen, controlling the target photographic device to perform an optical zoom backoff and back to half the current optical zoom ratio of the target photographic device; performing face region detection on the display screen of the target camera device after the optical zoom backoff is performed; and when no face region is detected in the display screen of the target photographic device after the optical zoom backoff is performed, controlling the target photographic device to perform another optical zoom backoff and back to a wide-angle end.

In an alternative embodiment, the apparatus 400 can further include a backoff module. The backoff module is configured for performing face region detection on a display screen of the target photographic device after the controlling the target photographic device to perform digital zoom; and when no face region is detected in the display screen, determining whether the person face region is in the whole captured picture; if yes, adjusting the display screen to display the person face region; and if no, controlling the target photographic device to perform digital zoom backoff and optical zoom backoff.

In an alternative embodiment, the control module 440 can include a parameter acquisition module 441, a coordinate determining module 442, and a step length determining module 443. The parameter acquisition module 441 is configured for obtaining point positions of a focus motor of the target photographic device at the time of acquiring a preset number of successive frame images, respectively, and obtaining definitions of the frame images.

The coordinate determining module 442 is configured for determining a coordinate point corresponding to each of the frame images based on a plurality of the point positions of the focus motor and a plurality of definitions obtained, respectively, and a coordinate value of the coordinate point corresponding to each of the frame images can includes the point position of the focus motor at the time of acquiring a corresponding frame image and the definition of the corresponding frame image.

The step length determining module 443 is configured for determining a target adjustment step length of the focus motor of the target photographic device based on coordinate values of coordinate points corresponding to a first target frame image, a second target frame image, a third target frame image, and a fourth target frame image of the successive frame images. The fourth target frame image is a frame image before the third target frame image, the third target frame image, the second target frame image, and the first target frame image are sequentially adjacent frame images, and the first target frame image is the last frame image of the successive frame images.

In an alternative embodiment, the step length determining module 443 can include a first parameter determining unit 4431, a second parameter determining unit 4432, and a step length determining unit 4433.

The first parameter determining unit 4431 is configured for determining a first angle change value and a first residual change rate of a first coordinate point based on a first coordinate value, a second coordinate value, and a fourth coordinate value. The first coordinate value is a coordinate value of the first coordinate point corresponding to the first target frame image, the second coordinate value is a coordinate value of a second coordinate point corresponding to the second target frame image, and the fourth coordinate value is a coordinate value of a fourth coordinate point corresponding to the fourth target frame image. The first angle change value is an amount of change between a first average definition value per step and a second average definition value per step, the first average definition value per step is an average definition value per step between the first target frame image and the fourth target frame image, the second average definition value per step is an average definition value per step between the first target frame image and the second target frame image, and the first residual change rate is configured to indicate a change rate of definition per step between the first target frame image and the second target frame image.

The second parameter determining unit 4432 is configured for determining a second angle change value and a second residual change rate of a second coordinate point based on the second coordinate value, a third coordinate value, and the fourth coordinate value. The third coordinate value is a coordinate value of a third coordinate point corresponding to the third target frame image, the second angle change value is an amount of change between a third average definition value per step and a fourth average definition value per step, the third average definition value per step is an average definition value per step between the second target frame image and the fourth target frame image, the fourth average definition value per step is an average definition value per step between the second target frame image and the third target frame image, and the second residual change rate is configured to indicate a change rate of definition per step between the second target frame image and the third target frame image.

The step length determining unit 4433 is configured for determining the target adjustment step length of the focus motor of the target photographic device based on the first angle change value, the first residual change rate, the second angle change value, and the second residual change rate.

In an alternative embodiment, the step length determining unit 4433 can include a first difference value determining subunit 44331, a second difference value determining subunit 44332, and a step length determining subunit 44333.

The first difference value determining subunit 44331 is configured for determining a first difference value between the first angle change value and the second angle change value.

The second difference value determining subunit 44332 is configured for determining a second difference value between the first residual change rate and the second residual change rate.

The step length determining subunit 44333 is configured for determining the target adjustment step length of the focus motor of the target photographic device based on the first difference value and the second difference value.

In an alternative embodiment, the step length determining subunit 44333 can include a convergence determining subunit 443331 and a target step subunit 443332. The convergence determining subunit 443331 is configured for determining a target convergence value based on the first difference value and the second difference value. The target step length subunit 443332 is configured for determining the target adjustment step length based on the target convergence value.

In an alternative embodiment, the target step length subunit 443332 can include a first step length subunit 4433321 and a second step length subunit 4433322. The first step length subunit 4433321 is configured for determining the target adjustment step length to be a preset step value when the target convergence value satisfies a first condition. The second step length subunit 4433322 is configured for determining the target adjustment step length to be an initial step when the target convergence value does not satisfy the first condition. The initial step is a step used by the target photographic device in acquiring the preset number of the successive frame images.

In an alternative embodiment, the control module 440 can further include a focus module 444, which is configured for performing focus to the target photographic device based on the target adjustment step length after the determining the target adjustment step length of the focus motor of the target photographic device.

Specific limitations regarding the photographing control apparatus can be found in the limitations of the photographing control method above and would not be repeated herein. The various modules in the above-described photographing control apparatus may be implemented in whole or in part by software, hardware, and combinations thereof. Each of the above modules may be embedded in hardware form in or independent of a processor in a computer device, or may be stored in software form in a memory in a computer device, so as to facilitate the processor to call for the execution of the operations corresponding to each of the above modules. All of the above modules are located in the same processor, or, the above modules are located in different processors in any combination.

Figure 16:
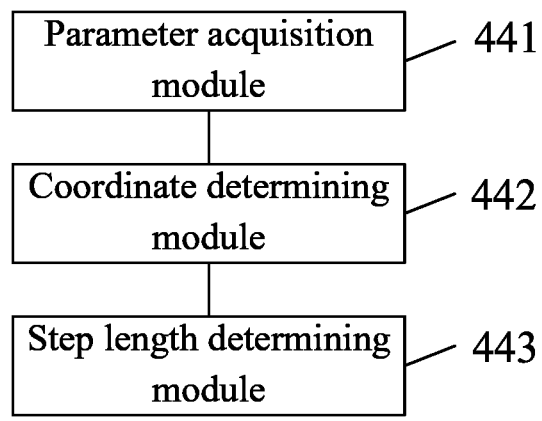
FIG. 16 is a block diagram of a device for determining a focus step length according to an embodiment of the present disclosure.

It should be noted that the method of determining the focus step length can not only be implemented during the process of controlling the target photographic device to perform optical zoom in the photographing control method, but also be implemented separately. The parameter acquisition module 441, the coordinate determining module 442, and the step length determining module 443 can also be implemented separately as a whole (e.g., a device for determining the focus step length), as shown in FIG. 16.

Figure 17:
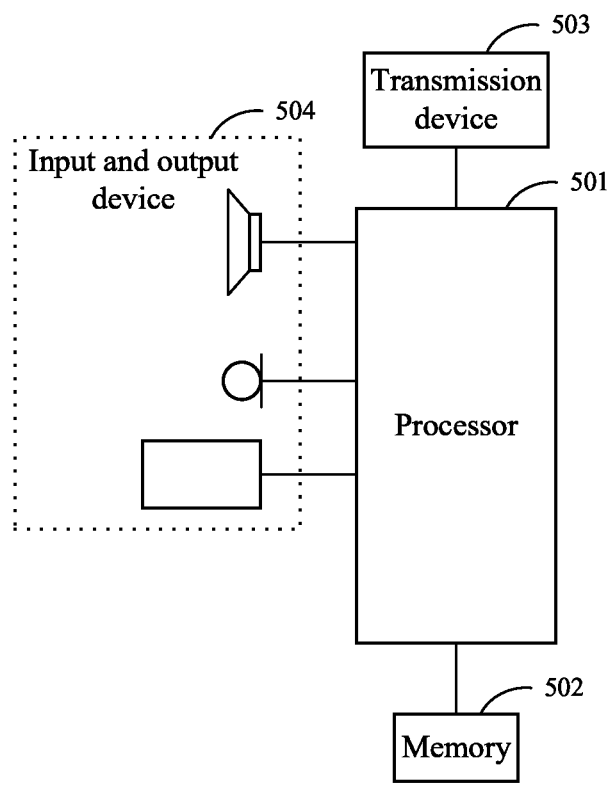
FIG. 17 is a block diagram of a hardware structure of a mobile terminal for a method of determining a focus step length according to an embodiment of the present disclosure.

The embodiments of the method of determining the focus step length can be executed in a mobile terminal, a computer terminal, or a similar computing device. As an example, running on a mobile terminal, FIG. 17 is a block diagram of a hardware structure of a mobile terminal for a method of determining a focus step length according to an embodiment of the present disclosure. Referring to FIG. 17, the mobile terminal can include one or more (only one is shown in FIG. 17) processors 501 (the processor 501 may include, but is not limited to, a processing device such as a Micro Control Unit (MCU), a Field Programmable Gate Array (FPGA), etc.) and a memory 502 for storing data. The mobile terminal can also include a transmission device 503 for a communication function and an input-output device 504. As may be understood by those skilled in the art, the structure shown in FIG. 17 is merely schematic, and it does not limit the structure of the above-described mobile terminal. For example, the mobile terminal can also include more or fewer components than that shown in FIG. 17, or have a configuration different from that shown in FIG. 17.

The memory 502 is configured to store a computer program, e.g., a software program and module for an application software, such as a computer program corresponding to the method of determining the focus step length in an embodiment of the present disclosure. The processor 501 can perform various functional applications as well as data processing, i.e., realize the above-described method, by running the computer program stored in the memory 502. The memory 502 may include a high-speed random memory, and may also include a non-volatile memory, such as one or more magnetic storage devices, flash memories, or other non-volatile solid-state memories. In some embodiments, the memory 502 may further include memories set remotely relative to the processor 501, and these remote memories may be connected to the mobile terminal via a network. Examples of the network may include, but are not limited to, the Internet, an enterprise intranet, a local area network, a mobile communication network, and combinations thereof.

The transmission device 503 is configured to receive or send data via a network. Specific examples of the network described above may include a wireless network provided by a communication provider of the mobile terminal. In an embodiment, the transmission device 503 may include a Network Interface Controller (NIC) that may be connected to other network devices via abase station so that it may communicate with the Internet. In an embodiment, the transmission device 503 may be a Radio Frequency (RF) module for communicating with the Internet wirelessly.

Figure 18:
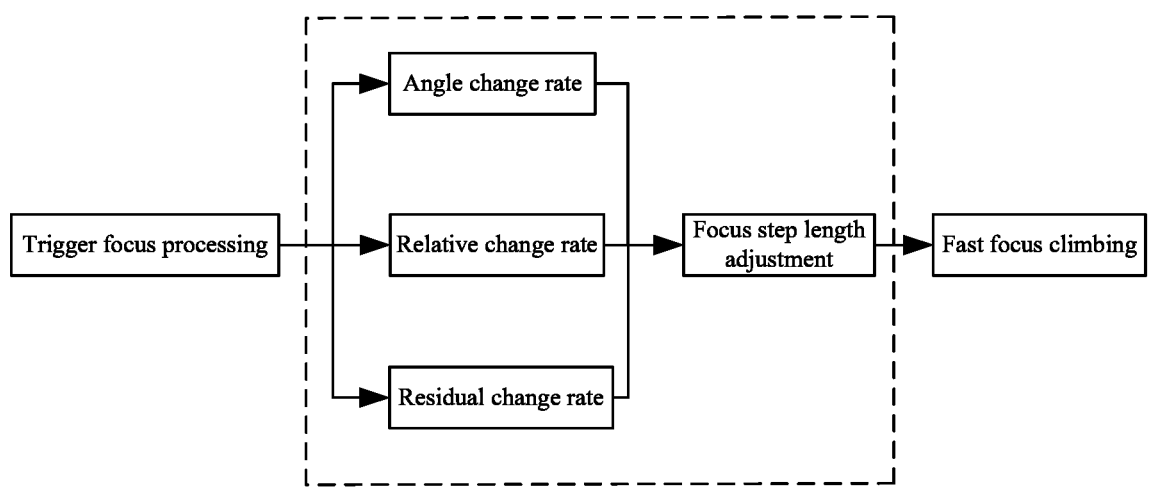
FIG. 18 is a schematic diagram of a device for determining focus step length according to a specific embodiment of the present disclosure.

Referring to FIG. 18, the present disclosure may also relate to specific device structures including a focus triggering module, an angle change rate determining unit, a relative change rate determining unit, a residual change rate determining unit, a step length adjustment unit, and a focus climbing module.

The focus triggering module is configured to trigger focus processing.

The angle change rate determining unit is configured to perform a calculation of an angle change rate.

The relative change rate determining unit is configured to perform a calculation of a relative change rate.

The residual change rate determining unit is configured to perform a calculation of a residual change rate.

The step length adjustment unit (corresponding to the target step length subunit 443332) is configured to perform focus step length adjustment.

The focus climbing module (corresponding to the focus module 444) is configured to perform focus processing based on an adjusted focus step length.

The present disclosure can further provide a computer device, including a processor and a memory that stores a computer program running on the processor. The computer program is executed by the processor to implement the steps of the photographing control method in any one of the above embodiments.

The present disclosure can further provide a storage medium having stored a computer program. The computer program is executed by a processor to implement the steps of the photographing control method in any one of the above embodiments.

Those skilled in the art may appreciate that realizing all or part of the processes in the methods of the above embodiments is possible by means of a computer program that instructs the associated hardware to do so, and the computer program may be stored in a non-volatile computer-readable storage medium. When the computer program is executed, the processes of the embodiments of the various methods described above may be included. Any reference to a memory, a storage, a database, or other medium used in the embodiments provided in the present disclosure may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronous link DRAM (SLDRAM), a memory bus (Rambus), a direct RAM (RDRAM), a direct memory bus dynamic RAM (DRDRAM), and a memory bus dynamic RAM (RDRAM).

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

What is claimed is:

1. A photographing control method, comprising:
   determining a first ratio, wherein the first ratio is a ratio of the current optical zoom ratio of a target photographic device to a maximum optical zoom ratio of the target photographic device;
   determining a second ratio, wherein the second ratio is a proportion of an area of a person face region currently captured by the target photographic device in a whole captured picture; and
   determining whether the first ratio is less than or equal to a first ratio threshold and the second ratio is less than or equal to a second ratio threshold;
      if yes, controlling the target photographic device to perform optical zoom; and if
      no, controlling the target photographic device to perform digital zoom.

2. The photographing control method of claim 1, wherein for a single person face currently captured by the target photographic device, the second ratio is a proportion of an area of the single person face in the whole captured picture; and
   for a plurality of person faces currently captured by the target photographic device, the second ratio is a proportion of an area of a combined face region in the whole captured picture, wherein the area of the combined face region is a sum of areas of the plurality of person faces.

3. The photographing control method of claim 1, wherein the first ratio threshold is in a range from 0.45 to 0.55.

4. The photographing control method of claim 1, wherein the second ratio threshold is in a range from 0.15 to 0.25.

5. The photographing control method of claim 1, wherein the method further comprises:
   determining a center position of a person region based on information of the whole captured picture currently captured by the target photographic device; and
   either or both of controlling the target photographic device to move and controlling the target photographic device to rotate, according to the center position of the person region and a center position of the whole captured picture, so that the center position of the person region coincides with the center position of the whole captured picture.

6. The photographing control method of claim 5, wherein the either or both of controlling the target photographic device to move and controlling the target photographic device to rotate is performed before the determining the first ratio.

7. The photographing control method of claim 5, wherein the determining the center position of the person region based on information of the whole captured picture currently captured by the target photographic device comprises:
   for a single person face currently captured by the target photographic device, determining a center position of the single person face as the center position of the person region; and
   for a plurality of person faces currently captured by the target photographic device, determining a center position of a combined person body region as the center position of the person region, wherein the combined person body region is a closed region determined based on image boundaries of person bodies corresponding to the plurality of person faces, and the closed region covers images of person bodies.

8. The photographing control method of claim 5, wherein the either or both of controlling the target photographic device to move and controlling the target photographic device to rotate, according to the center position of the person region and the center position of the whole captured picture comprises:
   determining a horizontal position offset angle based on an object distance and a horizontal offset between the center position of the person region and the center position of the whole captured picture;
   determining a vertical position offset angle based on the object distance and a vertical offset between the center position of the person region and the center position of the whole captured picture; and
   controlling the target photographic device to rotate based on the horizontal position offset angle and the vertical position offset angle, wherein the object distance is a distance between an actual position of a currently captured face and an actual position of the target photographic device.

9. The photographing control method of claim 8, wherein the object distance is determined based on the current optical zoom ratio of the target photographic device and the second ratio.

10. The photographing control method of claim 1, wherein after the controlling the target photographic device to perform optical zoom or controlling the target photographic device to perform digital zoom, a ratio of an area of a person region in a display screen of the target photographic device to a total area of the display screen is in a range from 0.7 to 0.8;
    for a single person face currently captured by the target photographic device, the area of the person region is an area of image region of a person body corresponding to the single person face; and
    for a plurality of person faces currently captured by the target photographic device, the area of the person region is an area of a combined person body region, the combined person body region is a closed region determined based on image boundaries of person bodies corresponding to the plurality of person faces, and the closed region covers images of person bodies.

11. The photographing control method of claim 10, wherein the area of image region of the person body is determined based on an area of a corresponding region of the single person face and a preset multiplier, and the preset multiplier is a preset ratio of the area of image region of the person body to the area of the person face region.

12. The photographing control method of claim 1, wherein after the controlling the target photographic device to perform optical zoom, the method further comprises:

performing face region detection on a display screen of the target photographic device;

when no face region is detected in the display screen, controlling the target photographic device to perform an optical zoom backoff and back to half the current optical zoom ratio of the target photographic device;

performing face region detection on the display screen of the target camera device after the optical zoom backoff is performed; and when no face region is detected in the display screen of the target photographic device after the optical zoom backoff is performed, controlling the target photographic device to perform another optical zoom backoff and back to a wide-angle end.

13. The photographing control method of claim 1, wherein after the controlling the target photographic device to perform digital zoom, the method further comprises:

performing face region detection on a display screen of the target photographic device; and when no face region is detected in the display screen, determining whether the person face region is in the whole captured picture;
if yes, adjusting the display screen to display the person face region; and
if no, controlling the target photographic device to perform digital zoom backoff and optical zoom backoff.

14. The photographing control method of claim 1, wherein the controlling the target photographic device to perform optical zoom further comprises:

obtaining point positions of a focus motor of the target photographic device at the time of acquiring a preset number of successive frame images, respectively, and obtaining definitions of the frame images;

determining a coordinate point corresponding to each of the frame images based on a plurality of the point positions of the focus motor and a plurality of definitions obtained, respectively, wherein a coordinate value of the coordinate point corresponding to each of the frame images comprises the point position of the focus motor at the time of acquiring a corresponding frame image and the definition of the corresponding frame image; and determining a target adjustment step length of the focus motor of the target photographic device based on coordinate values of coordinate points corresponding to a first target frame image, a second target frame image, a third target frame image, and a fourth target frame image of the successive frame images, wherein the fourth target frame image is a frame image before the third target frame image, the third target frame image, the second target frame image, and the first target frame image are sequentially adjacent frame images, and the first target frame image is the last frame image of the successive frame images.

15. The photographing control method of claim 14, wherein the determining the target adjustment step length of the focus motor of the target photographic device based on coordinate values of coordinate points corresponding to the first target frame image, the second target frame image, the third target frame image, and the fourth target frame image of the successive frame images further comprises:

determining a first angle change value and a first residual change rate of a first coordinate point based on a first coordinate value, a second coordinate value, and a fourth coordinate value, wherein the first coordinate value is a coordinate value of the first coordinate point corresponding to the first target frame image, the second coordinate value is a coordinate value of a second coordinate point corresponding to the second target frame image, and the fourth coordinate value is a coordinate value of a fourth coordinate point corresponding to the fourth target frame image; the first angle change value is an amount of change between a first average definition value per step and a second average definition value per step, the first average definition value per step is an average definition value per step between the first target frame image and the fourth target frame image, the second average definition value per step is an average definition value per step between the first target frame image and the second target frame image, and the first residual change rate is configured to indicate a change rate of definition per step between the first target frame image and the second target frame image;

determining a second angle change value and a second residual change rate of a second coordinate point based on the second coordinate value, a third coordinate value, and the fourth coordinate value, wherein the third coordinate value is a coordinate value of a third coordinate point corresponding to the third target frame image, the second angle change value is an amount of change between a third average definition value per step and a fourth average definition value per step, the third average definition value per step is an average definition value per step between the second target frame image and the fourth target frame image, the fourth average definition value per step is an average definition value per step between the second target frame image and the third target frame image, and the second residual change rate is configured to indicate a change rate of definition per step between the second target frame image and the third target frame image; and determining the target adjustment step length of the focus motor of the target photographic device based on the first angle change value, the first residual change rate, the second angle change value, and the second residual change rate.

16. The photographing control method of claim 15, wherein the determining the target adjustment step length of the focus motor of the target photographic device based on the first angle change value, the first residual change rate, the second angle change value, and the second residual change rate further comprises:

determining a first difference value between the first angle change value and the second angle change value;
determining a second difference value between the first residual change rate and the second residual change rate; and
determining the target adjustment step length of the focus motor of the target photographic device based on the first difference value and the second difference value.

17. The photographing control method of claim 16, wherein the determining the target adjustment step length of the focus motor of the target photographic device based on the first difference value and the second difference value further comprises:

determining a target convergence value based on the first difference value and the second difference value; and
determining the target adjustment step length based on the target convergence value.

18. The photographing control method of claim 17, wherein the determining the target adjustment step length based on the target convergence value further comprises:

when the target convergence value satisfies a first condition, determining the target adjustment step length to be a preset step value; and when the target convergence value does not satisfy the first condition, determining the target adjustment step length to be an initial step, wherein the initial step is a step used by the target photographic device in acquiring the preset number of the successive frame images.

19. The photographing control method of claim 14, wherein after the determining the target adjustment step length of the focus motor of the target photographic device, the method further comprises:

performing focus to the target photographic device based on the target adjustment step length.

20. A non-transitory computer-readable storage medium having stored a computer program, wherein the computer program is executed by a processor to implement the steps of the photographing control method of claim 1.

\* \* \* \* \*